United States Patent [19]
Ogawa et al.

[11] Patent Number: 6,024,913
[45] Date of Patent: Feb. 15, 2000

[54] PRECISION QUENCHING APPARATUS AND METHOD WITH INDUCTION HEATING

[75] Inventors: Yasuharu Ogawa; Daiji Itoh, both of Kanagawa; Yoshimasa Tanaka, Tokyo; Hisashi Tabuchi, Kanagawa, all of Japan

[73] Assignee: Neturen Co., Ltd., Tokyo, Japan

[21] Appl. No.: 09/018,040

[22] Filed: Feb. 3, 1998

[51] Int. Cl.[7] .................................................. C21D 11/00
[52] U.S. Cl. ........................... 266/78; 266/129; 266/130; 266/131
[58] Field of Search .............................. 266/78, 129, 130, 266/131; 148/567

[56] References Cited

U.S. PATENT DOCUMENTS 5,488,219  1/1996  Tanaka et al. .

FOREIGN PATENT DOCUMENTS 7-161461  6/1995  Japan .
7-272845  10/1995  Japan .

OTHER PUBLICATIONS

Japanese Patent Abstract No. JP401083367A, Mar. 1989.
Japanese Patent Abstract No. JP408013037A, Jan. 1996.
Metals Handbook Ninth Edition, vol. 4 Heat Treating, p40, Aug. 1982.

*Primary Examiner*—Scott Kastler
*Attorney, Agent, or Firm*—Finnegan, Henderson, Farabow, Garrett & Dunner, L.L.P.

[57] ABSTRACT

In the apparatus: Y table 43 carries a work W and travels a predetermined distance in direction Y in a reciprocating manner; X table 41 causes the work W to reciprocate in direction X between a first position, in which the work W is loaded onto and unloaded from Y table 43, and a fourth position, in which an induction heating coil 23 is disposed; X table 41 is mounted on a base frame 11; a first reference on Y table 43 positions rows of quenched portions 76*a* of the work W in desired locations when the work W is loaded onto Y table 43; a second reference on Y table 43 serves as a reference for determining coordinates of Y table 43; a position measuring means 32 in a second position intermediate between the first and the third position measures coordinates of the second reference and of the quenched portions 76*a*; and, a control means 100 issues signals to control X-Y table 40 together with the heating coil 23 based on the measured coordinates.

12 Claims, 13 Drawing Sheets

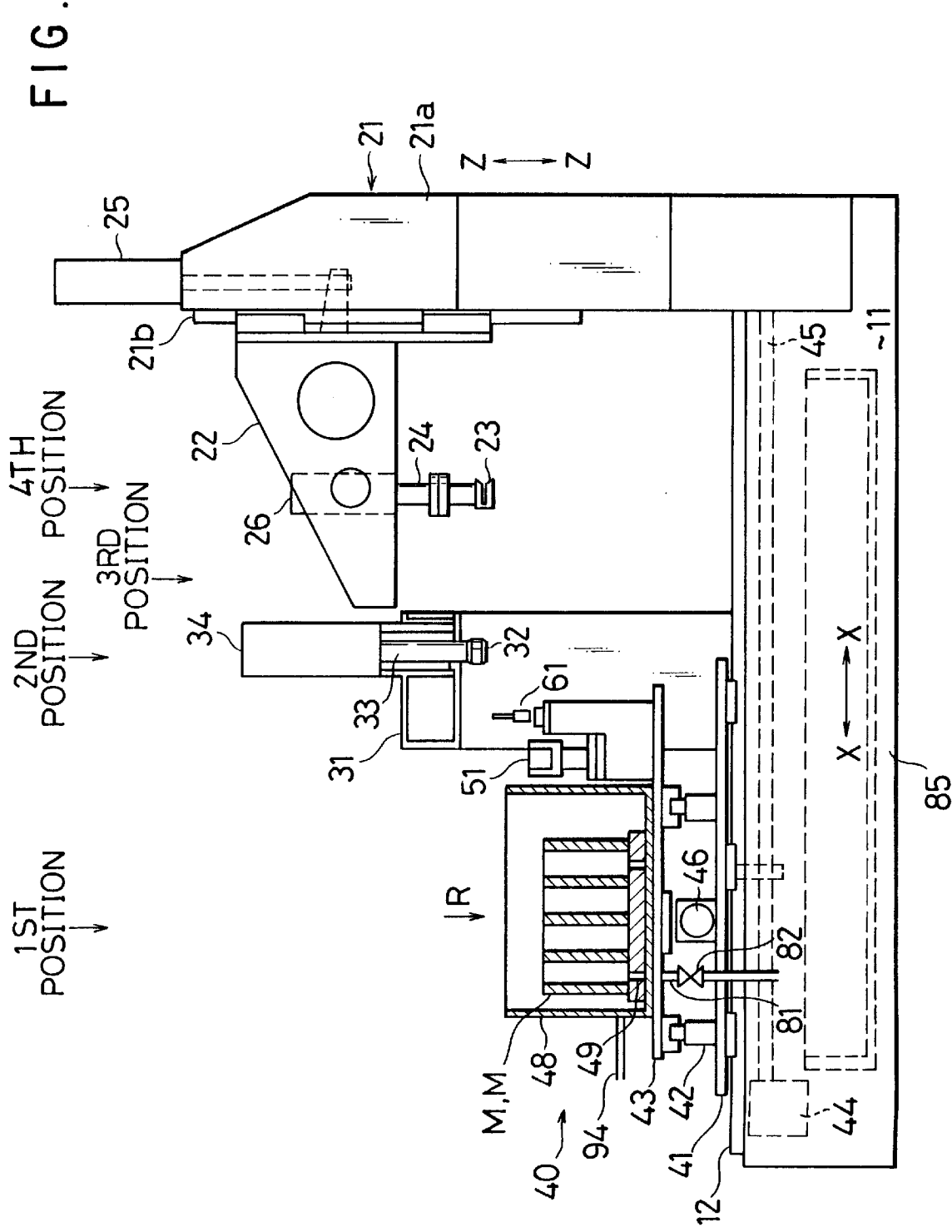

PRECISION QUENCHING APPARATUS AND METHOD WITH INDUCTION HEATING

BACKGROUND OF THE INVENTION

1. Field of the Invention

The present invention relates to a precision quenching apparatus and method with induction heating, particularly, for producing a predetermined mottled pattern of a plurality of rows of individually quenched layer portions in an inner peripheral surface of a cylinder in a cylinder block of an engine, for example such as diesel engines and the like used under heavy loads.

2. Description of the Prior Art

For example, in an inner peripheral surface of a cylinder of a diesel engine used under a heavy load, there is formed a mottled pattern of individually quenched layer portions through a conventional inner surface quenching method. In this connection, the applicant of the present application has already proposed an induction heating coil and an induction quenching method in Japanese Patent Laid-Open Nos. Hei 7-161461 and Hei 7-272845.

However, such conventional quenching method with induction heating is disadvantageous in that: when a center of the cylinder deviates from that of the induction heating coil to fail to keep constant a clearance between an inner peripheral surface of the cylinder and an outer peripheral surface of the induction heating coil, a plurality of concyclic portions of the cylinder to be quenched differ in temperature from each other after heating, which makes it impossible to produce a constant pattern of quenched portions of the cylinder, the quenched portions differing from each other also in quenched depth.

For example, as for a quenching of the cylinder having an inner diameter of 80 mm, experiments have shown that the above-mentioned clearance must be 1.25 mm plus or minus 0.15 mm, and the deviation in center of the heating coil from the cylinder must be up to 0.03 mm. Consequently, in order to produce the above-mentioned constant pattern of quenched portions of the cylinder, it is necessary for the induction heating coil to position its center within a radius of several tens of $\mu$m from the center of the cylinder when the quenching of the cylinder is carried out. However, such positioning operation is very cumbersome when an engine's cylinder block has a plurality of the cylinders to be quenched, and, therefore not suitable for a quenching method in mass production.

In general, water or aqueous solution is used as a cooling medium or cooling liquid in the quenching operation of the cylinder. When the cooling liquid is too low in temperature for the quenching operation of the cylinder, distortion and quenching crack of the cylinder tend to occur. On the other hand, when the cooling liquid is too high in temperature, the cooling liquid is poor in cooling power, and, therefore fails to sufficiently quench the cylinder.

Consequently, it is necessary to keep the cooling liquid at a temperature of from 30 to 40 degrees centigrade during the quenching operation. However, as is clear from the above, such temperature of from 30 to 40 degrees centigrade of the cooling liquid is higher than room temperatures. As a result, a quenching apparatus used in this quenching operation increases in temperature, and, therefore thermally expands because of its increasing temperature. Consequently, a base frame of the apparatus also expands to deviate from its initial set position, which makes it impossible to realize a precision quenching operation. Namely, the temperature of the entire apparatus is equal to room temperature before the start of the quenching operation.

Under such circumstances, when the cooling liquid having a temperature of from 30 to 40 degrees centigrade, which is higher than the room temperature, is discharged into and from a cooling liquid tank of the apparatus each time the quenching operation is conducted, the base frame of the apparatus increases in temperature to thermally expand, which causes a center of the cylinder to deviate from a corresponding center of the induction heating coil. As a result, the apparatus fails to keep constant the clearance between an inner peripheral surface of the cylinder being quenched and an outer peripheral surface of the induction heating coil on the same circumferential plane, which makes it impossible for the above-mentioned mottled pattern of the cylinder to be uniformly produced.

In order to overcome the above problems, it is possible for the quenching apparatus to employ a suitable control means, in which a value representing the above-mentioned deviation of the center of the cylinder is incorporated to compensate for such deviation occurring in the quenching operation. The apparatus of this type is used after it reaches a predetermined working temperature. However, such apparatus takes too much time to reach such working temperature. Particularly, in winter, it is necessary to warm up the apparatus by discharging the cooling liquid having a temperature of from 30 to 40 degrees centigrade into and from the cooling liquid tank, which takes too much time and labour, and, therefore forces the operators of this apparatus to do such warm-up job in the early morning. This is disadvantageous from the economical point of view. In order to overcome the above problem, the quenching apparatus may be disposed in a constant temperature chamber. Alternatively, a suitable chiller or chilling machine for precisely controlling the cooling liquid in temperature may be used. However, both the constant temperature chamber and the chiller are expensive in installation, and, therefore also disadvantageous from the economical point of view.

Further, in case that a plurality of rows of the mottled pattern of individually quenched portions of the cylinder are produced, the cooling liquid gradually increases in temperature during quenching operation. Consequently, the quenched layer portions of the cylinder in the first row are always smaller in quenched depth than those in the subsequent row. This is a problem inherent in the conventional quenching method and apparatus.

SUMMARY OF THE INVENTION

Under such circumstances, the present invention was made. Consequently, it is an object of the present invention to provide a precision quenching apparatus and method with induction heating, particularly, for producing, on a large scale basis, a predetermined mottled pattern of uniformly quenched layer portions in an inner peripheral surface of each of a plurality of cylinders in a cylinder block of an engine by automatically and precisely setting a center of each of the cylinders and a corresponding center of an induction heating coil.

According to a first aspect of the present invention, the above object of the present invention is accomplished by providing:

A precision quenching apparatus with induction heating, for quenching a plurality of rows of portions of a workpiece or work cylinder block (hereinafter referred to as the work block), the apparatus comprising:

a Y table for carrying the work block thereon, the Y table being capable of travelling a predetermined distance in direction Y in a reciprocating manner;

an X table for causing the work block mounted on the Y table to move back and forth in a reciprocating manner in direction X between a first position, in which the work block is loaded onto and unloaded from the Y table, and a fourth position, in which the induction heating coil is disposed;

a base frame on which the X table is movably mounted;

a first reference member mounted on the Y table, the first reference member performing a function in positioning the plurality of rows of the quenched portions-to-be of the work block in desired locations when the work block is loaded onto the Y table;

a second reference member mounted on the Y table, the second reference member serving as a reference point for determining coordinates of the Y table;

a position measuring means for measuring coordinates of both a position of the second reference member and positions of the quenched portions-to-be of the work block to issue measured coordinate values, the position measuring means being disposed in a second position intermediate between the first and the third position on the base frame;

an induction heating coil disposed in the fourth position on the base frame; and a control means for controlling the X and the Y table in position together with the induction heating coil on the basis of the measured coordinate values issued from the position measuring means.

According to a second aspect of the present invention, the above object of the present invention is accomplished by providing:

The precision quenching apparatus with induction heating, as set forth in the first aspect of the present invention, wherein:

the work block to be quenched is a cylinder block provided with a plurality of cylinders which are arranged in line and spaced apart from each other at intervals of "A"; and the control means carries out a precision quenching method with induction heating, the method comprising the steps of:

(1) mounting a master cylinder block (herein after referred to as the master block) on the Y table in a manner such that the master block has a row of its in-line cylinders aligned with an X axis with reference to the first reference member mounted on the Y table, the master block having the same dimensions as those of the work block;

(2) moving both the X and the Y table to a position (Xo, Yo), in which the position measuring means coincides in center with the second reference member, to measure the coordinates of the position (Xo, Yo);

(3) further moving both the X and the Y table to a position (X1, Y1), in which the position measuring means coincides in center with a first cylinder bore of the polycrystalline, to measure the coordinates of the position (X1, Y1);

(4) calculate a position ((X1+(n−1)xA), Y1), to which both the X and the Y table is moved and in which the position measuring means coincides in center with the n'th cylinder bore of the polycrystalline, on the basis of the coordinates of the position (X1, Y1);

(5) moving both the X and the Y table to a position (Xp, Yp), in which the first cylinder bore coincides in center with the induction heating coil, to measure the coordinates of the position (Xp, Yp);

(6) storing all the coordinates of the positions (Xo, Yo), (X1, Y1), ((X1+(n−1)xA), Y1), (Xp, Yp) in the control means;

(7) replacing the master block with the work block;

(8) moving both the X and the Y table to a position ((X1+(n−1)xA+an), (Y1+bn)), in which the position measuring means coincides in center with the n'th cylinder bore of the work block, to measure the coordinates of the position ((X1+(n−1)xA+an), (Y1+bn)), wherein each of an and bn are deviations from preset values; and (9) further moving both the X and the Y table to a position ((Xp+(n−1)xA−an), (Yp−bn)), in which the n'th cylinder bore of the work block has its inner surface induction-heated and quenched, wherein each of an and bn are deviations from preset values.

In other words, a precision quenching method of the present invention, which is performed by the apparatus of the present invention, comprises: a preparation stage using the master block; and, a quenching stage for quenching an inner surface of the work block.

In the preparation stage of the precision quenching method of the present invention, the master block having the same dimension as those of the work block, i.e., work cylinder block being quenched is mounted on the Y table in a manner such that a row of cylinders of the master block is disposed in parallel to the X axis with reference to the first reference member on the Y table. Then, the X and the Y table are moved so as to have the second reference member on the Y table coincide in center with the position measuring means at the position (Xo, Yo). The thus measured coordinates of the position (Xo, Yo) forms origin of a coordinate system in this case. After that, the X and the Y table are further moved so that the n'th cylinder bore of the master block mounted on the Y table coincides in center with the position measuring means at the position (Xn, Yn), the coordinates of which position (Xn, Yn) are measured. Then, the X and the Y table are further moved so that the n'th cylinder bore coincides in center with the induction heating coil at the position (Xp, Yp), the coordinates of which position (Xp, Yp) are measured, whereby the preparation stage of the precision quenching method of the present invention comes to the finish. After that, the quenching stage of the method of the present invention starts. In this quenching stage, the master block is replaced with the work block with reference to the first reference member on the Y table. At this time, the work block is slightly deviated in position from the master block. In this case, the amounts of deviations (an, bn) in position of the work block from the master block on the Y table depend on the precision of the work block and positioning accuracies thereof on the Y table. Due to the presence of such deviations (an, bn), it is necessary to measure the position ((Xn+an), (Yn+bn)) in which the n'th cylinder bore of the work block coincides in center with the position measuring means. In order to precisely set the n'th cylinder bore of the work block at a position corresponding to that of the induction heating coil, it is necessary to further move the work block relative to the Y table by the amounts corresponding to the deviations (an, bn). Consequently, the X and the Y table are moved to a position ((Xp−an), (Yp−bn)) thus compensated. After that, the induction heating coil is inserted into the n'th cylinder bore of the work block to perform the quenching operation with induction heating. According to the present invention, as described above, the control means automatically performs the above-mentioned individual operations such as the X and the Y table's motion, measurement of the coordinates of the n'th cylinder bore, storage of the deviations (an, bn), correction of the coordinates thus measured, and insertion of the induction heating coil into the cylinder bore. Consequently, it is possible for the apparatus and method of the present invention to have the cylinder bore of the work block automatically coincide in center with the induction heating coil, which results in an effective quenching treatment of the inner surface of the cylinder bore with induction heating.

For example, when the work block is a cylinder block provided with a plurality of cylinders arranged in line and has an inner surface of each of its cylinders quenched with induction heating, a precision quenching method of the method of the present invention can be used, in which method:

(1) in a preparation stage of quenching operation, a master block is mounted on the Y table in a manner such that the master block has a row of its in-line cylinders precisely aligned with an X axis with reference to the first reference member mounted on the Y table, the master block having the same dimensions as those of the work block, whereby the Y-coordinate of a first cylinder is used also in the remaining cylinders to identify their Y-coordinates;

(2) a first cylinder bore M1 of the master block is moved to coincide in center with the position measuring means at a position (X1, Y1) after the origin of the coordinate system is set at a position (Xo, Yo), wherein the coordinates of the position (X1, Y1) are measured, and thereafter the first cylinder bore M1 is moved to coincide in center with the induction heating coil at a position (Xp, Yp) the coordinates of which are measured;

(3) since the cylinders arranged in line and spaced apart from each other at intervals of "A" is precisely aligned with the X axis, the coordinates of a position of any one of the remaining cylinder bores, for example, the n'th cylinder bore can be calculated at ((X1+(n−1) xA), Y1) after the coordinates of the first cylinder bore are determined, wherein the coordinates of the position ((X1+(n−1)xA), Y1) are stored in a control means;

(4) then, a quenching stage of quenching operation starts, in which the master block is replaced with the work block on the Y table so that the work block is set at the same position as that of the master block with reference to the first reference member, whereby the cylinder bores of the work block coincide in position with those of the master block, provided that some deviations occur due to positioning error and the precision of the work block, which deviations are eliminated through the following corrective operation before the precision quenching operation of the inner surface of the work block is performed;

(5) the coordinates of a position, in which each of the cylinder bores of the work block coincides in center with the inner diameter measuring unit, are measured, wherein, for example, the coordinates of a position of the n'th cylinder bore are determined to be ((X1+(n−1) xA+an), (Y1+bn)) and stored in the control means, wherein an, bn are deviations of the n'th cylinder bore of the work block from those of the corresponding cylinder bore of the master block, wherein the control means automatically moves the X and the Y table to the position ((X1+(n−1)xA), Y1) to permit the inner diameter measuring unit to measure the deviations ((X1+(n−1)xA+an), (Y1+bn)) in inner diameter' position, wherein all these operations are automatically performed as to each of the cylinder bores, and the coordinates of these cylinder bores are stored in the control means; and (6) after the deviations (an, bn) in coordinates are determined through the above operations, the X and the Y table is moved to a position ((Xp+(n−1)xA−an), (Yp−bn)) which is a correct position of the n'th cylinder bore free from the deviations (an, bn) and in which the n'th cylinder bore is aligned in position with the induction heating coil to permit the heating coil to enter the n'th cylinder bore, so that the quenching operation of the inner surface of each of the cylinder bores of the work block is performed.

In the precision quenching method of the present invention described above, since the above individual operations are automatically conducted by the control means, the work block provided with the in-line cylinders spaced apart from each other at intervals of "A" can be easily positioned, and, therefore precisely quenched with induction heating at high speed in its inner surface.

Further, in the precision quenching apparatus and method of the present invention, preferably: the induction heating coil is mounted on the vertical shaft so as to be axially movable up and down in the direction Z and circumferentially rotatable in the direction Θ, which permits the induction heating coil to enter and exit the cylinder bore of the work block, the vertical shaft being provided in the fourth position on the base frame; and, the control means is provided with a control portion for issuing pulse signals which energize and control the induction heating coil in its axial motion and in circumferential rotation.

In the quenching operation in which the work block has the inner peripheral surface of its cylinder bore quenched to form a mottled pattern of its quenched layer portions: preferably, the induction heating coil has an outer diameter slightly smaller than an inner diameter of the cylinder bore of the work block by a predetermined clearance, and is provided with the annular conductive member having a plurality of concave portions. These concave portions correspond in position to the quenched layer portions of the mottled pattern formed in the inner peripheral surface of the cylinder bore.

Namely, in the quenching apparatus of the present invention having the above construction, it is possible for the induction heating coil to axially move up and down and circumferentially rotate through a predetermined angle, wherein these axial motion and circumferential rotation of the induction heating coil are precisely controlled by the control means. Further, the concave portions provided in the inner peripheral surface of the annular conductive member of the induction heating coil facilitate production of the mottled pattern of the quenched layer portions of the work block in the inner surface of the cylinder bore of the work block, the mottled pattern being constructed of a plurality of rows of the quenched layer portions of the work block.

In quenching operation, the induction heating coil is inserted into the cylinder bore of the work block, and intermittently moved step by step in a longitudinal direction (i.e., direction Z) of the cylinder bore by a predetermined stroke in each step, and also intermittently rotated in the circumferential direction of the cylinder bore through a predetermined angle in each step, so that the portions to be quenched of the inner peripheral surface of the cylinder bore corresponding in position to the concave portions of the annular conductive member are quenched to easily form the mottled pattern of the thus quenched portions, wherein the mottled pattern is constructed of the plurality of rows of quenched portions.

Further, the second reference member is constructed of a gauge ring an inner diameter of which is equal to that of the cylinder bore of the work block, the cylinder bore being so disposed as to have its longitudinal axis be perpendicular to the X and the Y table' surface. On the other hand, the position measuring means is constructed of the inner diameter measuring unit. This unit is provided with a measuring head portion in which at least three extensible and retractable probes are radially provided. In operation, these probes are brought into contact with the inner peripheral surface of the cylinder bore of the work block to determine the deviations of a center of the cylinder bore. The measuring head portion of the inner diameter measuring unit is capable of moving up and down in the direction Z in the second position so as to enter and exit each of the gauge ring and the cylinder bore of the work block.

Further, in measuring operation, a probe measuring unit fixedly mounted on the Y table has its probe brought into contact with each of an outer peripheral surface of the inner diameter measuring unit and an outer peripheral surface or a bottom surface of the induction heating coil to measure their positions, and stores the coordinates of each of the inner diameter measuring unit, induction heating coil, and, the X and the Y table therein to correct in position each of the inner diameter measuring unit and the induction heating coil, which makes it possible to check and correct at any time the position of the induction heating coil. Consequently, in the apparatus and method of the present invention, even when the induction heating coil varies in position, there is no fear that the operator fails to perform a precision quenching operation of the work block.

In the quenching apparatus of the present invention, the cooling means for injecting the cooling liquid into the cylinder bore of the work block during quenching operation with induction heating may be provided. Alternately, the cooling tank may be provided in the apparatus of the present invention. In the quenching operation with induction heating, the cylinder bore of the work block is immersed in the cooling liquid of the cooling tank so as to be quenched with induction heating in the cooling liquid, which enables the work block to be quenched immediately after induction heating comes to the finish, whereby each of the portions of the work block is uniformly quenched to reach a sufficient hardness.

Further, the cooling tank is provided with: a liquid level controlling means for keeping constant the level of the cooling liquid received in the cooling tank; and, a liquid exchanging means for exchanging the cooling liquid for a new one each time the quenching operation of the work block or of a part of the work block is performed, which makes it possible to promptly replace the used and therefore heated cooling liquid with a new one which is uniform in temperature, whereby the quenched portions of the work block may be uniformly formed in hardness.

In this case, the cooling liquid supply tank for recirculating and supplying the cooling liquid is thermally isolated from the base frame while incorporated therein. Preferably, this supply tank is provided with a liquid temperature control means for controlling in temperature the cooling liquid so as to keep it at substantially room temperature, which realizes a precision quenching operation with induction heating.

More particularly, as is performed in the prior art, when the cooling liquid having a temperature of from 30 to 40 degrees centigrade which is higher than room temperatures is used in the quenching operation, the distance between the position measuring unit (i.e., inner diameter measuring unit) and the induction heating coil varies since the base frame thermally expands. Such variation in distance between the position measuring unit and the induction heating coil may be minimized using the cooling liquid having the room temperatures due to reduction in temperature variations in the base frame. Consequently, in the apparatus and method of the present invention, it is possible to realize a precision quenching operation with induction heating without using a special means. Further, in the present invention, since the cooling liquid supply tank incorporated in the base frame is thermally isolated from the base frame, there is no fear that variations of temperature in the cooling liquid directly affect the base frame, which may further improve in precision the quenching operation.

Further, when the work block has its cylinder's inner peripheral surface quenched with induction heating using the cooling liquid to form a mottled pattern of quenched layer portions arranged in a plurality of rows in the inner peripheral surface of the cylinder of the work block, preferably, the mottled pattern has its rows sequentially formed from an upper one toward a lower one in a condition in which the cylinder bore of the work block is immersed in the cooling liquid.

In other words, in order to form the plurality of rows of the quenched layer portions in the inner peripheral surface of the cylinder of the work block, when the quenching operation of the cylinder bore of the work block is repeatedly performed in the same cooling liquid according to the prior art, the temperature of the cooling liquid gradually increases, so that any adjacent ones of the rows differ from each other in cooling rate, and, therefore differ from each other in hardness and in thickness of the quenched layer portions. In order to minimize such difference in cooling rate, when the mottled pattern has its rows formed from a lower one toward an upper one in the quenching operation according to the prior art, the cooling liquid heated when the lower one of the rows is formed is moved upward by convection to decrease the cooling rate of the upper one of the rows, which makes the upper one worse in hardness and thickness of the quenched layer portions. In contrast with this, in the present invention, since the mottled pattern has its rows formed from an upper one toward a lower one in the quenching operation, and, therefore the heated cooling liquid does not move downward, there is no fear that the cooling rate of the lower one of the rows decreases to make the lower one poor in hardness and thickness of the quenched layer portions.

BRIEF DESCRIPTION OF THE DRAWINGS

FIG. 1 is a front view of an embodiment of the precision quenching apparatus of the present invention provided with the induction heating coil, wherein the work block is shown in dotted lines;

DESCRIPTION OF THE PREFERRED EMBODIMENTS

Hereinbelow, the present invention will be described in detail with reference to the accompanying drawings.

Figure 1A:
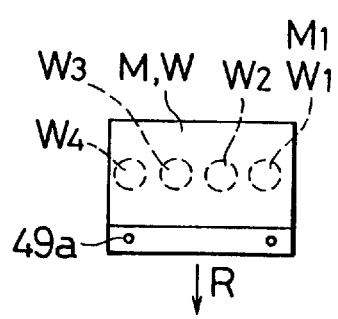
FIG. 1(a) is a plan view of the work block mounted on the apparatus of the present invention shown in FIG. 1, looking in the direction of the arrow R of FIG. 1.
Figure 2:
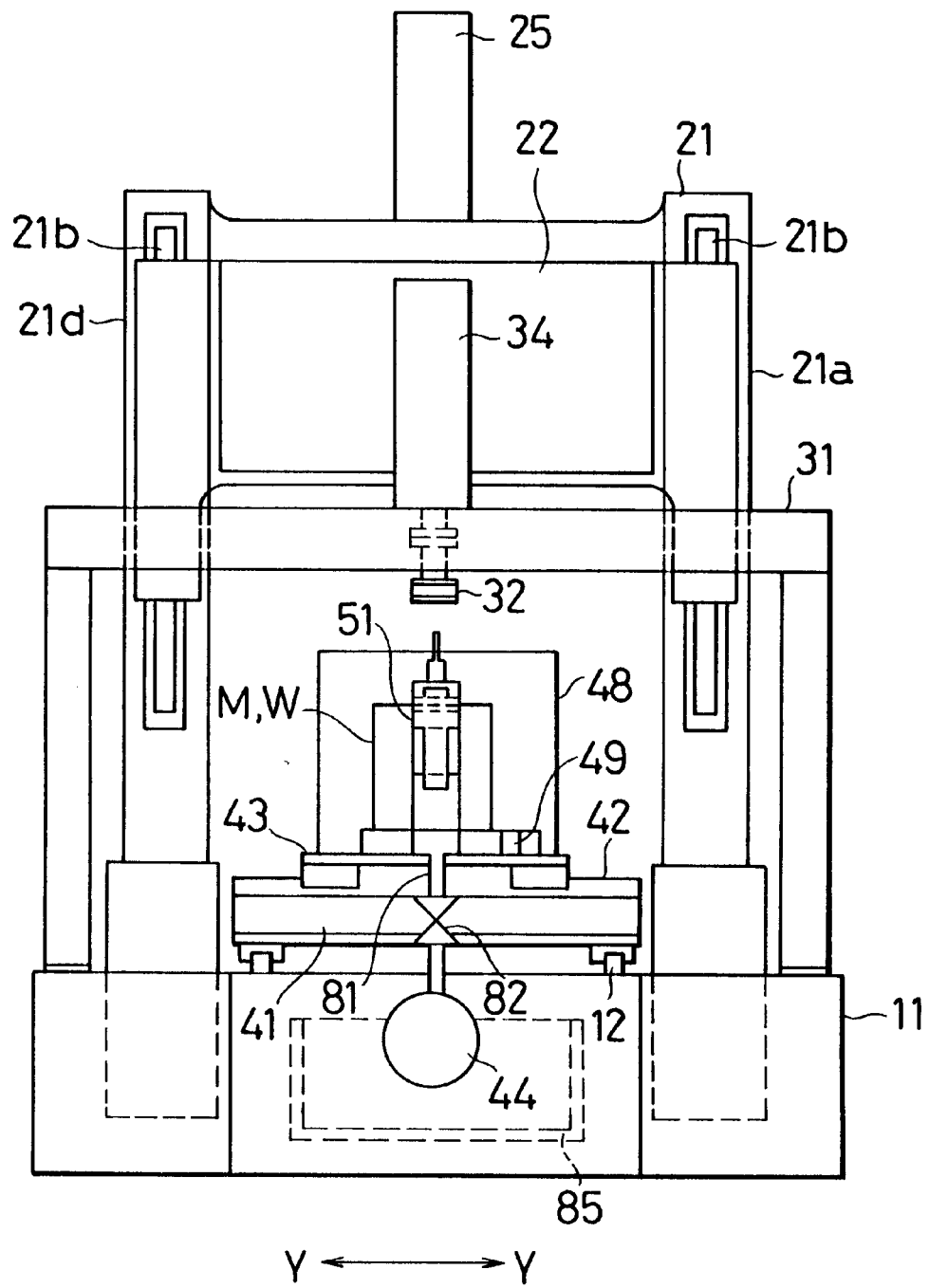
FIG. 2 is a side view of the quenching apparatus of the present invention shown in FIG. 1.

As shown in FIGS. 1 and 2, an embodiment of a precision quenching apparatus of the present invention is provided with a planer-type frame 21, which is fixedly mounted on a base frame 11 in a fourth position so as to stand astride the base frame 11, as shown in FIG. 2. The planer-type frame 21 is provided with a pair of column portions 21a on each of which a rail member 21b is fixedly mounted. Slidably mounted on these rail members 21b is a movable frame 22 which is capable of moving up and down along the rail members 21b.

In operation, the movable frame 22 is driven so as to move up and down in a direction Z by means of a first axial drive unit 25 such as servo-motors and the like when a control portion 101 of a control means 100 issues a pulse signal to the drive unit 25. On the other hand, a rotary drive unit 26, which is actuated upon receipt of a pulse signal issued from the control portion 101, is fixedly mounted on the movable frame 22. The rotary drive unit 26 is provided with a vertical drive shaft 24 on which an induction heating coil 23 is fixedly mounted. Consequently, the induction heating coil 23 is rotatably driven in the forward and the reverse direction by the rotary drive unit 26 when the unit 26 receives the pulse signal issued from the control portion 101.

Figure 8:
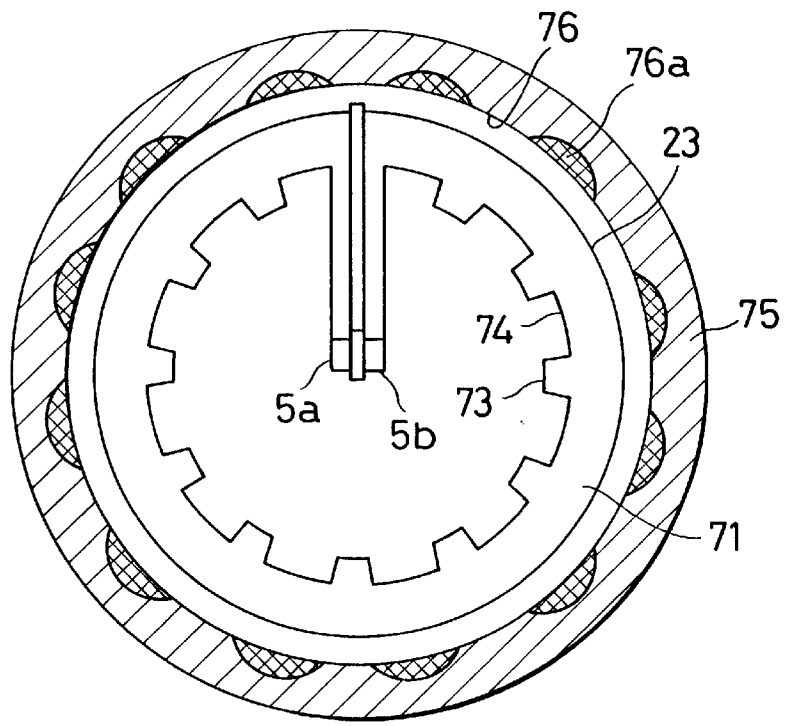
FIG. 8 is a plan view of the annular conductive member of the induction heating coil shown in FIG. 1.
Figure 9A:
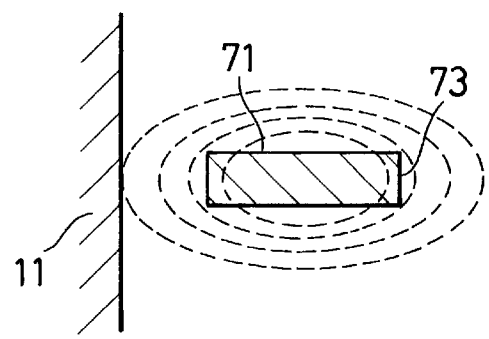
FIGS. 9(a) and 9(b) are schematic diagrams illustrating the principle of the induction heating coil used in the apparatus of the present invention shown in FIG. 1.
Figure 9B:
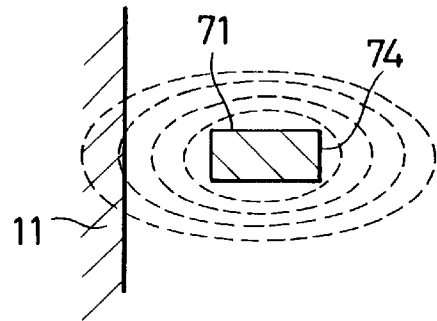

Further, as shown in FIG. 8, the induction heating coil 23 is provided with an annular conductive member 71 which forms an inductor 70. The member 71 is provided with a plurality of concave portions 74 in its inner peripheral surface. The number of these concave portions 74 is "m". These concave portions 74 lie on the same circumference of the annular conductive member 71, and are spaced apart from each other at equal angular intervals. Consequently, it is possible for the annular conductive member 71 to form a mottled pattern of quenched layer portions 76a in an inner peripheral surface 76 of a cylinder 75 of a cylinder block W being quenched (hereinafter referred to as the work block W). The number of the thus formed quenched layer portions 76a, which are formed into a plurality of rows in the mottled pattern, is given by an equation: m×((the number of indexing steps)+1), wherein m is the number of the concave portions 74 of the annular conductive member 71.

As described above, since the induction heating coil 23 is mounted on the vertical shaft 24 so as to rotate on a center line of the annular conductive member 71 and movably mounted on the movable frame 22 through the rotary drive unit 26 so as to move up and down, when the pulse signals are issued from the control portion 101 to the drive units 25, 26, the first axial drive unit 25 is actuated to move the movable frame 22 downward so that the induction heating coil 23 is moved downward to enter a cylinder bore of the work block W, whereby a first row of the quenched layer portions 76a of the mottled pattern is formed in a first predetermined position of the inner peripheral surface of the cylinder bore of the work block W.

Figure 3:
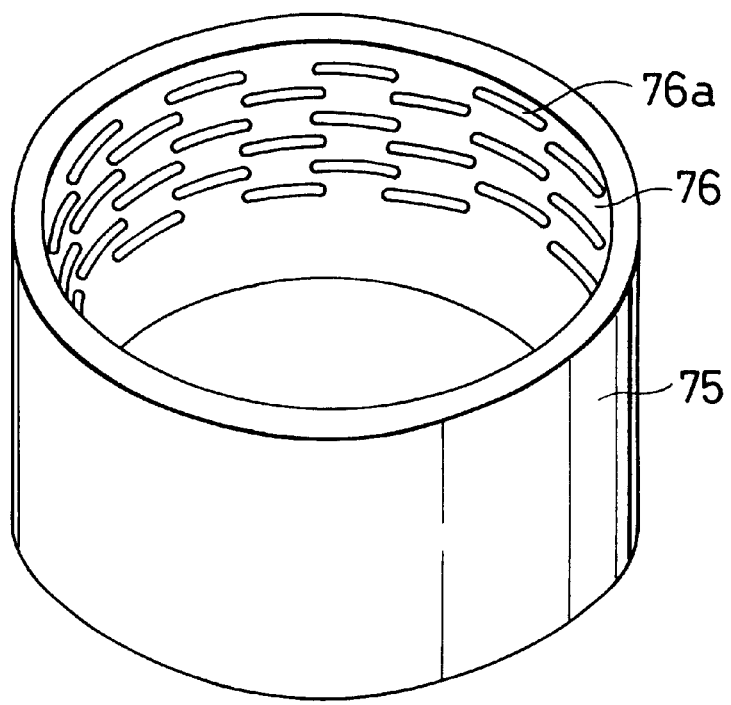
FIG. 3 is a perspective view of the cylinder of the work block to be quenched in the apparatus of the present invention shown in FIG. 1, illustrating the mottled pattern of individually quenched layer portions of the inner peripheral surface of the cylinder.

After that, the induction heating coil 23 is further moved downward by a predetermined distance in the direction Z while rotated through a predetermined angle Θm so that a second row of the quenched layer portions 76a of the mottled pattern is formed in a second predetermined position of the inner peripheral surface of the cylinder bore. The above operation is repeated so that a third row, a fourth row, . . . , a k'th row of the quenched layer portions 76a of the mottled pattern are formed in the inner peripheral surface of the cylinder bore of the work block W, as shown in FIG. 3.

Further, in the apparatus of the present invention, as shown in FIG. 1, a support frame 31 is fixedly mounted on a base frame 11 in a second position shown in FIG. 1 so as to stand astride the base frame 11. A second axial drive unit 34, which is actuated by a pulse signal issued from the control portion 101, is fixedly mounted in a substantially central portion of the support frame 31, as is clear from FIG. 2. Mounted on a lower portion of a vertical shaft 33 of the second axial drive unit 34 is a position measuring means (i.e., inner diameter measuring unit 32), which is preferably a four-probe type inner diameter measuring unit called Marposs measuring unit produced by Marposs Kabushiki Kaisha. The position measuring means, i.e., inner diameter measuring unit 32 is capable of moving up and down in the direction Z.

A pair of X rails 12, which are spaced apart from and parallel to each other, are fixedly mounted on an upper surface of the base frame 11 to extend over the substantially entire length of the base frame 11 in a direction X. An X table 41 is movably mounted on these X rails 12, and driven in the direction X between a first position and the fourth position in a reciprocating manner by means of suitable drive means such as a first pulse motor 44 and a ball screw unit 45, as shown in FIG. 1. A pair of Y rails 42, which are spaced apart from and parallel to each other, are fixedly mounted on an upper surface of the X table 41 to extend in a direction Y which is perpendicular to the plane of the paper of FIG. 1. A Y table 43 is movably mounted on these Y rails 42, and driven in the direction Y perpendicular to the plane of the paper of FIG. 1 in a reciprocating manner by means of suitable drive means such as a second pulse motor 46 and the like, which means are actuated upon receipt of a pulse signal issued from the control portion 101 of the control means 100.

As shown FIG. 1, the work block W shown in dotted lines is disposed in a cooling tank 48 in which the work block W is immersed in the cooling liquid. Under such circumstances, the work block W is induction-heated when the induction heating coil 23 is energized. When the induction heating coil 23 is de-energized, the thus heated work block W is then subjected to quenching due to the presence of the cooling liquid in which the work block W is immersed in the cooling tank 48. Another cooling means will be described later in detail. As shown in FIG. 1(a), the work block W is provided with a reference hole 49a, a corresponding one of which is also provided in a master cylinder block (hereinafter referred to as the master block) M. The work block W is positioned in the cooling tank 48 with reference to this reference hole 49a. Further, provided in a bottom surface of the cooling tank 48 is a first reference member, i.e., knock pin 49 which is inserted into the reference hole 49a of the work block W or into the above-mentioned corresponding one of the master block M to position the work block W or the master block M on the Y table 43. In this embodiment of the apparatus of the present invention shown in the drawings, though not shown, there is provided the above-mentioned cooling means such as a liquid injection nozzle and the like for injecting the cooling liquid into a cylinder bore of the work block W to facilitate the quenching of the work block W.

Figure 11:
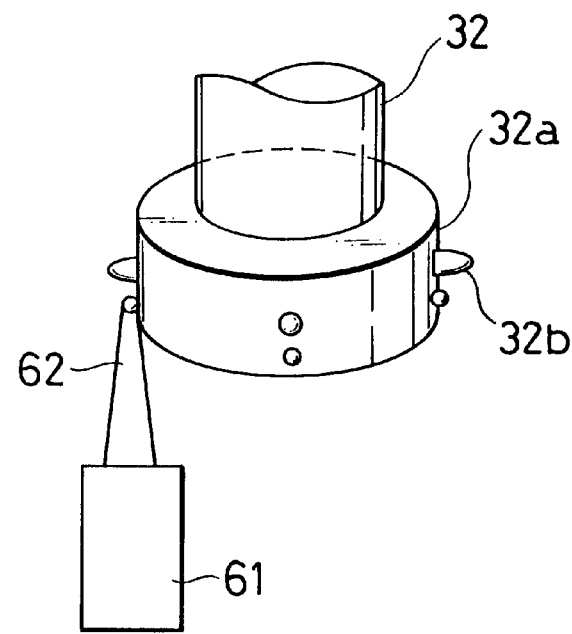
FIG. 11 is a perspective view of the inner diameter measuring unit shown in FIG. 10, illustrating the way the unit has its head portion measured in location by the contact-type electronic probe unit of the apparatus of the present invention.

As is clear from FIG. 1, a second reference member constructed of a gauge ring 51 is fixedly mounted on the Y table 43 in a position adjacent to a right wall portion of the cooling tank 48. The gauge ring 51 has the substantially same inner diameter of that of the cylinder bore of the work block W. The work block W is provided with a plurality of the cylinder bores arranged in line. These cylinder bores have their longitudinal axes lie in the same X plane in which a longitudinal axis of the gauge ring 51 also lies. Namely, as is clear from FIGS. 1 and 2, the gauge ring 51 is vertically arranged in parallel to the in-line cylinder bores of the work block W, and has its upper surface kept at the substantially same level as that of the work block W. Provided further adjacent to a right side of the gauge ring 51 on the Y table 43 is a contact-type electronic probe unit 61 (preferably, TL 35 TYPE produced by Marposs Kabushiki). As shown in FIG. 11, this probe unit 61 has its probe 62 brought in contact with the head portion 32a of the inner diameter measuring unit 32 or with an outer peripheral surface of the induction heating coil 23.

Figure 4:
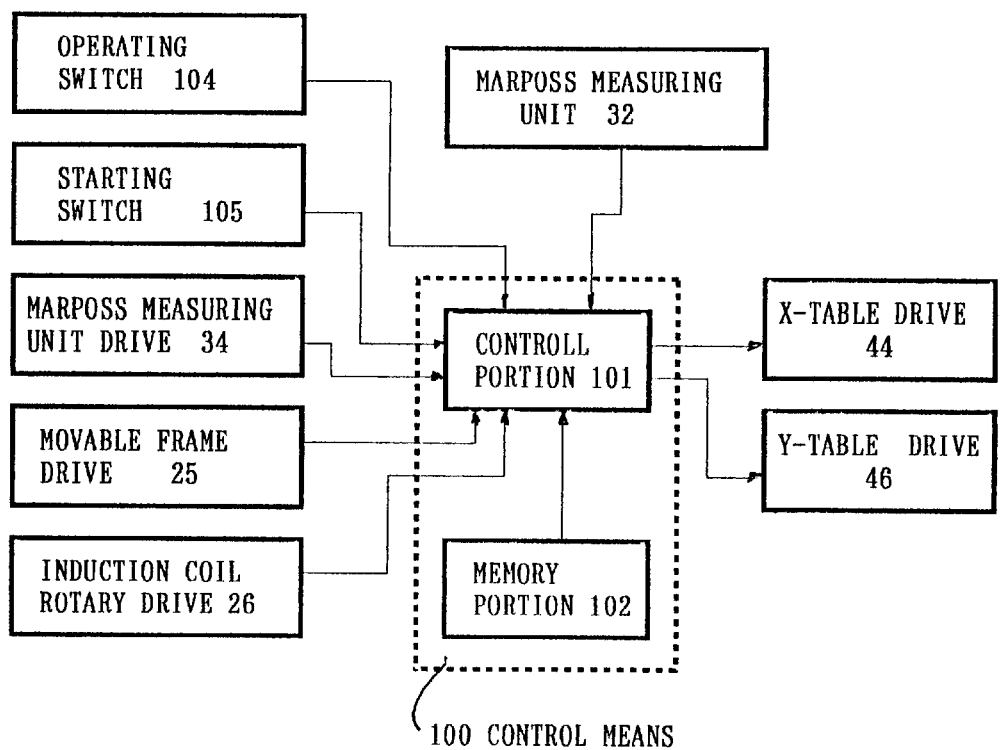
FIG. 4 is a schematic block diagram of the control means of the quenching apparatus of the present invention shown in FIG. 1.

As shown in FIG. 4, the control means 100 is constructed of the control portion 100 and a memory portion 102. The memory portion 102 stores therein: coordinates of positions of the X table 41 and of the Y table 43 in each of steps of a preparation stage of the quenching operation of the inner peripheral surface of the work block W, which steps will be described later; measured values of coordinates of a position of each of the cylinder bores of the work block W in a quenching stage (which will be described later) of the quenching operation; and, coordinates of a position of the induction heating coil 23 in operation. On the other hand, on the basis of the coordinates stored in the memory portion 102, the control portion 100 of the control means 100 issues a plurality of pulse signals to the drive units 25, 26, 34, 44, 46 to actuate them. Upon receipt of the pulse signals, these drive units 25, 26, 34, 44, 46 are actuated to drive each of the X table 41, Y table 43, inner diameter measuring unit 32, movable frame 22 and the induction heating coil 23 in a predetermined mode during the preparation and the quenching stage of the quenching operation.

Now, the precision quenching apparatus of the present invention with induction heating having the above construction will be described in operation when the work block W is provided with a plurality of in-line cylinders which are spaced apart from each other at intervals of "A".

Figure 5:
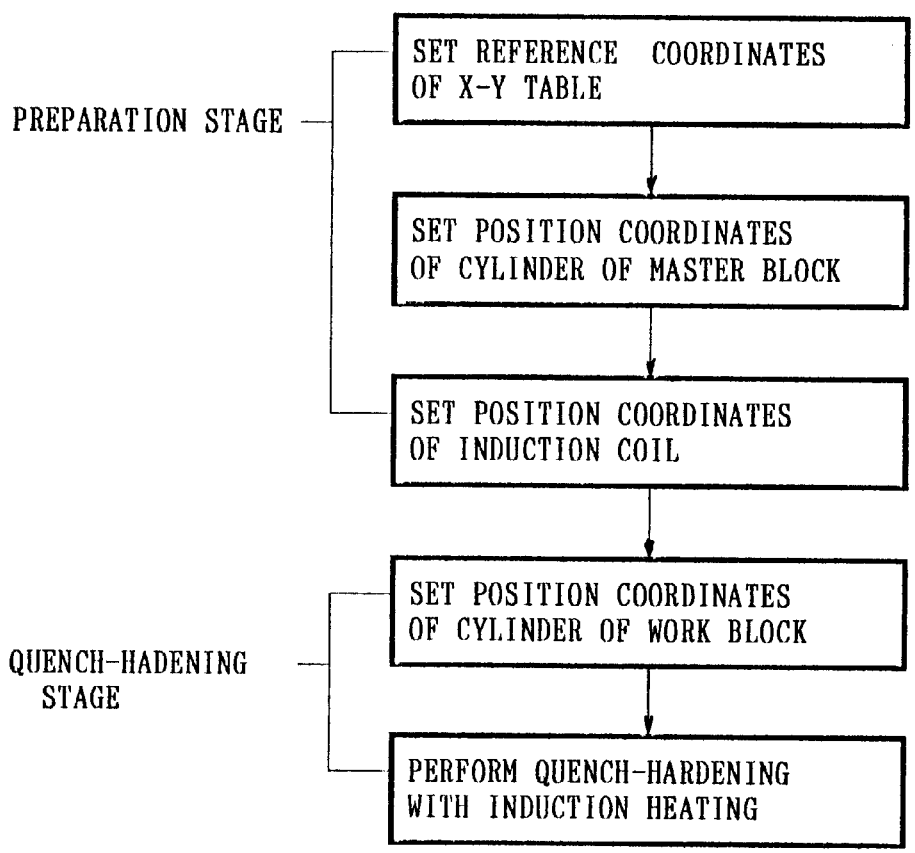
FIG. 5 is a flowchart of essential operations of the quenching apparatus of the present invention shown in FIG. 1.

As shown in FIG. 5, the quenching operation carried out by the apparatus of the present invention comprises the preparation stage and the quenching stage. Set in position in the preparation stage in an X-Y coordinate system are: the origin of the coordinate system for determining coordinates of positions of the X table 41 and the Y table 43; coordinates of the cylinder bores of the master block M; and, coordinates of the induction heating coil 23. On the other hand, in the quenching stage, coordinates of a position of each of the cylinder bores of the work block W are measured so that the quenching treatment with induction heating of the work block W is performed. These stages will be described in detail.

Figure 6:
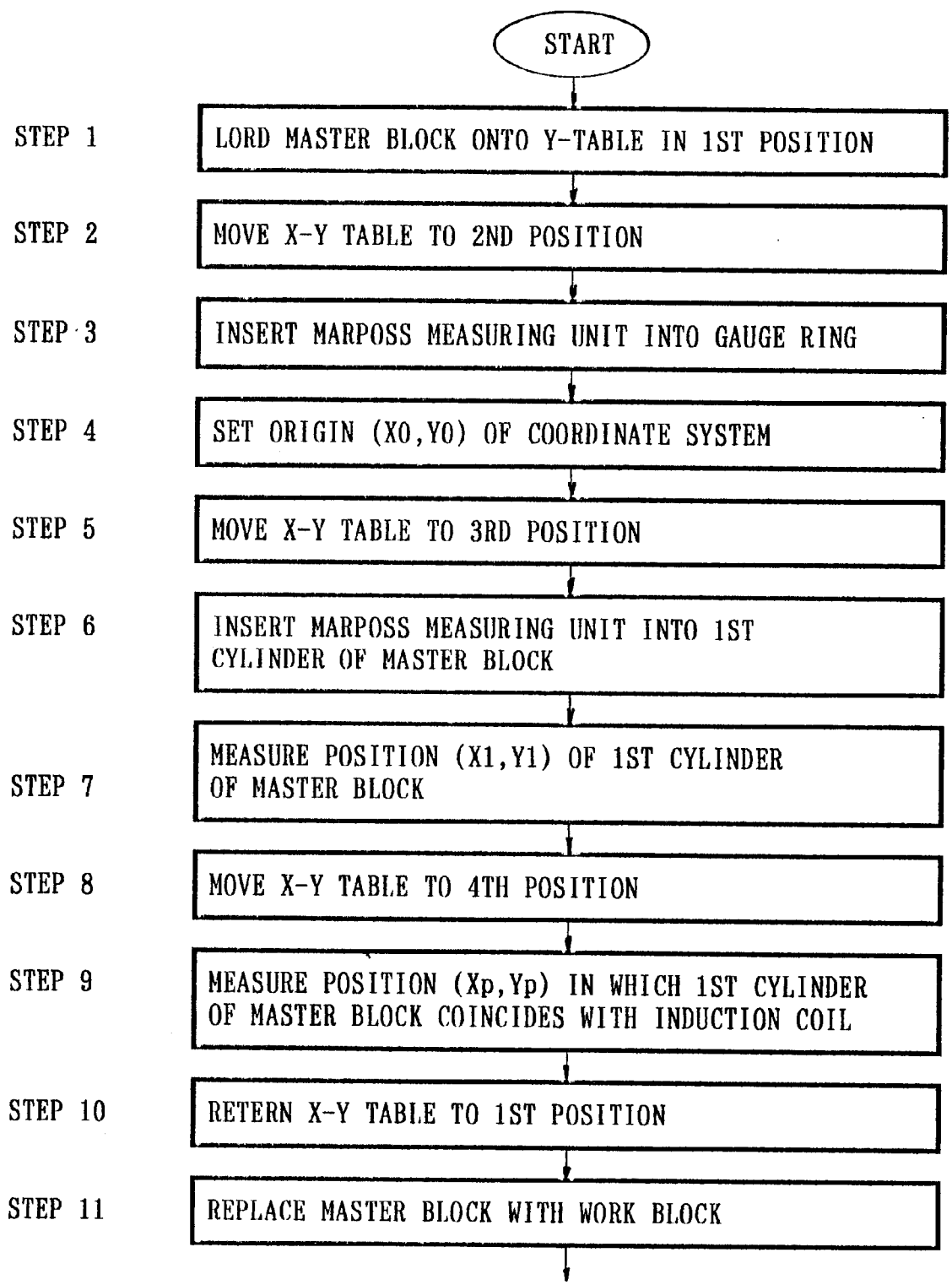
FIG. 6 is a flowchart of the preparation stage in the essential operations of the quenching apparatus of the present invention shown in FIG. 1.

As shown in a flowchart of FIG. 6, the preparation stage of the precision quenching operation with induction heating of the present invention comprises a plurality of steps 1 to 11.

In the step 1, the master block M, which is identical in profile with the work block W, is mounted on the Y table 43 after both the X table 41 and the Y table 43 are located in the first position shown in the left side of FIG. 1, so that the row of in-line cylinders of the master block M is arranged in parallel to the X axis with reference to the first reference member 49. At this time, parallelism within 0.01/500 mm (i.e., 0.0049") is held between the X axis and the row of these in-line cylinders. After completion of mounting of the master block M onto the Y table 43. The step 1 is followed by its subsequent step 2.

In the step 2: the X table 41 and the Y table 43 are moved to the second position in which the gauge ring 51 has its center disposed in the vicinity of a center of the inner diameter measuring unit 32. The step 2 is followed by its subsequent step 3.

Figure 10:
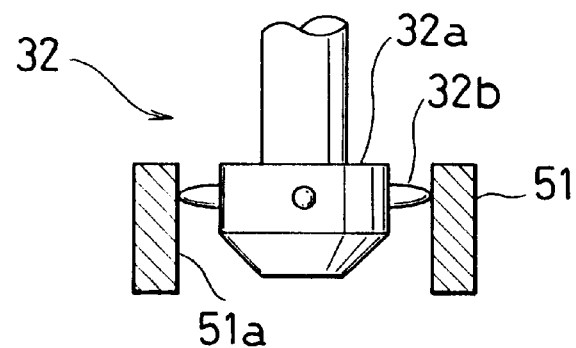
FIG. 10 is a partially broken side view of the inner diameter measuring unit used in the precision quenching apparatus of the present invention shown in FIG. 1, illustrating the way the unit measures an inner diameter of the gauge ring.

In the step 3: in the second position, the drive unit 34 is actuated by operating an operating switch 104 to drive downward the inner diameter measuring unit 32 (i.e., the Marposs measuring unit described above) in a manner such that the head portion 32a of the inner diameter measuring unit 32 enters a bore portion 51a of the second reference member, i.e., gauge ring 51, as shown in FIG. 10. As a result, four probes 32b of the inner diameter measuring unit 32 are brought into contact with an inner peripheral surface of the gauge ring 51 to determine an actual position of a center of the bore portion 51a of the gauge ring 51. Based on the thus determined actual position of the center of the bore portion 51a of the gauge ring 51, the X table 41 and the Y table 43 have their positions adjusted so that the center of the inner diameter measuring unit 32 precisely coincides with that of the gauge ring 51. After completion of such fine adjustment in position of the X table 41 and the Y table 43, the step 3 is followed by its subsequent step 4.

In the step 4: the coordinates of a position (Xo, Yo) of the X table 41 and of the Y table 43 thus adjusted in the above are defined as the origin of this coordinate system. The step 4 is followed by its subsequent step 5.

In the step 5: the X table 41 and the Y table 43 are moved to a third position shown in FIG. 1, wherein a center of a first cylinder bore M1 of the master block M reaches the second position in which the first cylinder bore M1 has its center disposed in the vicinity of a center of the inner diameter measuring unit 32. The step 5 is followed by its subsequent step 6.

In the step 6: in the second position, the drive unit 34 is actuated by operating an operating switch 104 to drive downward the inner diameter measuring unit 32 (i.e., the Marposs measuring unit described above) in a manner such that the head portion 32a of the inner diameter measuring unit 32 enters the first cylinder bore M1. The step 6 is followed by its subsequent step 7.

In the step 7: four probes 32b of the inner diameter measuring unit 32 are brought into contact with an inner peripheral surface of the first cylinder bore M1 to determine an actual position (X1, Y1) of a center of the first cylinder bore M1. The step 7 is followed by its subsequent step 8.

In the step 8: based on the thus determined actual position (X1, Y1) of the center of the first cylinder bore M1, the X table 41 and the Y table 43 are moved to a fourth position shown in FIG. 4, wherein the X table 41 and the Y table 43 have their positions adjusted so that the center of the inner diameter measuring unit 32 precisely coincides with that of the first cylinder bore M1. After completion of such fine adjustment in position of the X table 41 and the Y table 43. The step 8 is followed by its subsequent step 9.

In the step 9: the thus finely adjusted position (Xp, Yp), in which a center of the first cylinder bore M1 precisely coincides with that of the induction heating coil 23, is determined. The step 9 is followed by its subsequent step 10.

In the step 10: the X table 41 and the Y table 43 are returned to the first position shown in FIG. 1. The step 10 is followed by its subsequent step 11.

In the step 11: the master block M is replaced with the work block W, so that the preparation stage of the quenching operation comes to the finish.

In this preparation stage of operation, since parallelism within 0.01/500 mm (i.e., 0.0049") is held between the X axis and the row of the cylinders of the master block M, all the cylinder bores of the master block M are substantially identical with each other in Y coordinate in their position. Consequently, for example, coordinates of a position of a second cylinder bore M2 of the master block M may be defined as ((X1+A), Y1) since the cylinder bores of the master block M are spaced apart from each other by intervals of "A". As for the n'th cylinder bore of the master block M, coordinates of its position may be defined as ((X1+(n−1) xA), Y1). For example, in case that the "A" is 105 mm and the number of the cylinder bores of the master block M is four, coordinates of a position of each of the cylinder bores are defined as follows:

the first cylinder bore: (X1, Y1);
the second cylinder bore: ((X1+105), Y1);
the third cylinder bore: ((X1+210), Y1); and
the fourth cylinder bore: ((X1+315), Y1).

Coordinates of these positions are stored in the memory portion 102 of the control means 100 shown in FIG. 4.

More particularly, in the step 8: the X table 41 is moved to the fourth position shown in the right of FIG. 1, in which these tables 41, 43 are finely adjusted in position to determine an exact position (Xp, Yp) in which the center of the first cylinder bore M1 coincides with a center of the induction heating coil 23. In the above fine adjustment in position for finding out the exact position (Xp, Yp), it is possible to use a pin gauge for measuring a clearance between the cylinder bore and the heating coil 23, or a dial gauge fixedly mounted on the induction heating coil 23.

The above-mentioned preparation stage is done only when the work block W varies in profile. In other words, when a plurality of the work blocks W are quenched, no preparation stage is required for them except the first one.

Figure 7:
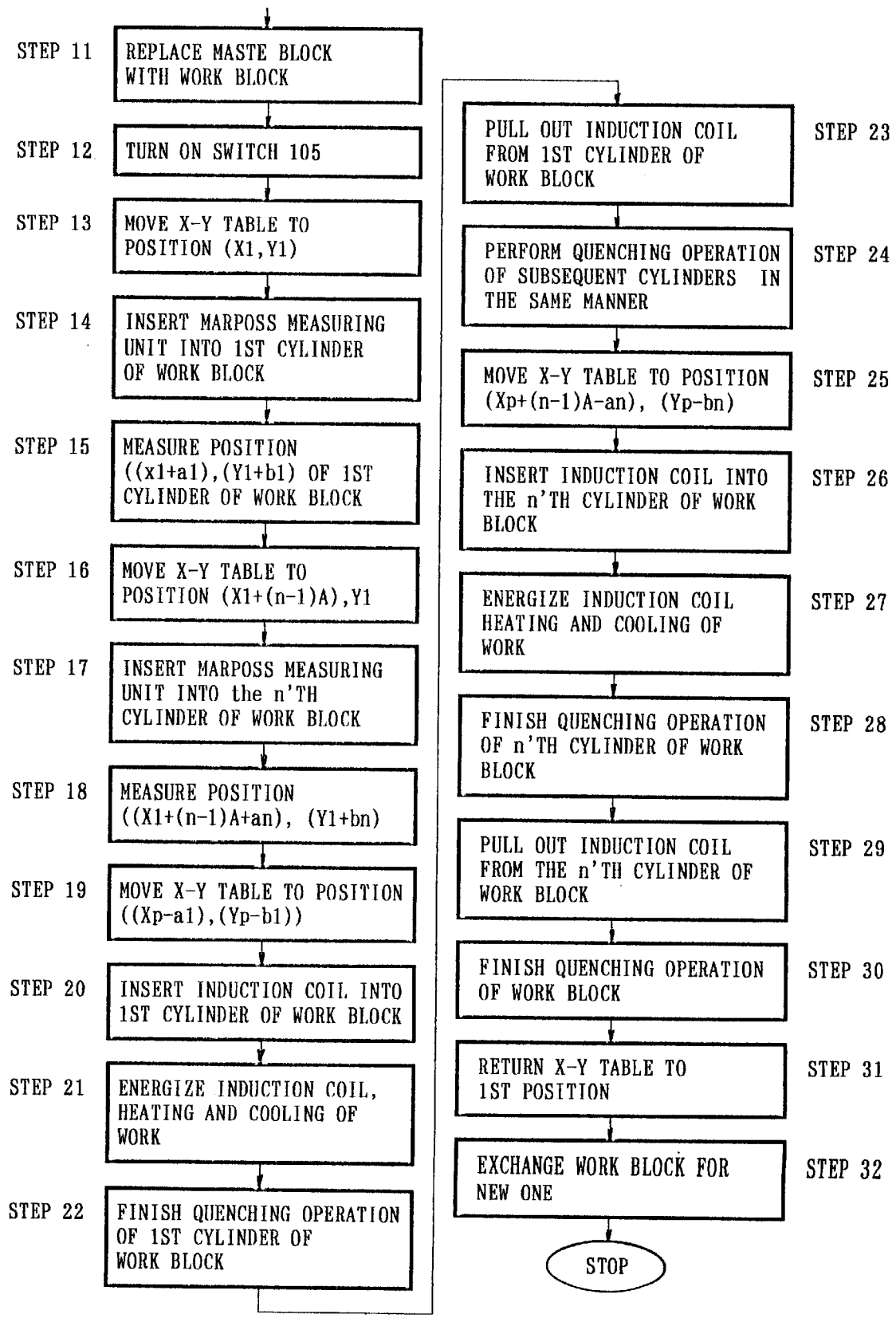
FIG. 7 is a flowchart of the quenching stage in the essential operations of the quenching apparatus of the present invention shown in FIG. 1.

The preparation stage is followed by the quenching stage shown in a flowchart of FIG. 7, provided that the step 11 belongs to the preparation stage shown in FIG. 6. Consequently, the quenching stage following the preparation stage comprises a plurality of steps 12 to 32.

In the step 12: a starting switch 105 of the apparatus of the present invention is turned to start the quenching stage. Although the work block W is already loaded onto the Y table 43 in the first position shown in FIG. 1 in the same manner as that of the master block M in the step 11 of the preparation stage, since the work block W slightly differs in profile and in position from the master block M due to variations in its machining tolerance and due to its positioning error, it is necessary to finely adjust in position the work block W in order to realize a precision quenching of the work block W. Such fine adjustment in position of the work block W is performed in a series of subsequent steps following the step 12, as follows.

In the step 13: when the starting switch 105 is turned on, the control portion 101 and the memory portion 102 of the control means 100 are energized to issue pulse signals to the drive units 44, 46. Upon receipt of these pulse signals, the drive units 44, 46 are actuated to move both the X table 41 and the Y table 43 to the position (X1, Y1). The step 13 is followed by its subsequent step 14.

In the step 14: the inner diameter measuring unit (i.e., Marposs measuring unit) 32 has its head portion 32a inserted into a first cylinder bore W1 of the work block W. The step 14 is followed by its subsequent step 15.

In the step 15: the head portion 32a of the inner diameter measuring unit 32 has its four probes 32b brought into contact with an inner peripheral surface of the first cylinder bore W1 to determine an actual position ((X1+a1), (Y1+b1)) of a center of the first cylinder bore W1, which makes it possible to determine deviations a1, b1 of the center of the first cylinder bore W1 from a center of the inner diameter measuring unit 32, wherein a1 is a deviation in the X axis, and b1 is a deviation in the Y axis in the coordinate system. The deviations a1, b1 are stored in the memory portion 102 of the control means 100.

After completion of this process, the control portion 101 of the control means 100 issues a pulse signal to the drive unit 34 to actuate the same. The drive unit 34 thus actuated pulls up the inner diameter measuring unit 32 from the first cylinder bore W1. After that, the X table 41 and the Y table 43 are moved so that a second cylinder bore W2 of the work block W reaches the position ((X1+A), Y1). At this time, deviations a2, b2 of a center of the second cylinder bore W2 from a center of the second cylinder bore M2 of the master block M are determined by the use of the inner diameter measuring unit 32 in the same manner as that of position measurement of the first cylinder bore W1, wherein a2 is a deviation in the X axis, and b2 is a deviation in the Y axis.

Consequently, it is possible to determine the actual position ((X1+A+a2), (Y1+b2)) of the center of the second cylinder bore W2 of the work block W. Coordinates of this actual position ((X1+A+a2), (Y1+b2)) are stored in the memory portion 102 of the control means 100. The step 15 is followed by its subsequent step 16.

In the step 16: in the same manner as that described above, actual positions of the subsequent cylinder bores of the work block W can be determined. More particularly, as for the n'th cylinder bore Wn of the work block W, the X table 41 and the Y table 43 are moved so that the n'th cylinder bore Wn reaches the second position. The step 16 is followed by its subsequent step 17.

In the step 17: the inner diameter measuring unit 32 is inserted into the n'th cylinder bore Wn. The step 17 is followed by is subsequent step 18.

In the step 18: a position of a center of the n'th cylinder bore Wn is determined to be ((X1+n−1)A+an), (Y1+bn)) by the use of the inner diameter measuring unit 32, and is stored in the memory portion 102 of the control means 100. In case that the "A" is 105 mm and the number of in-line cylinder bores W1, W2, W3, W4 of the work block is four, coordinates of positions of these cylinder bores W1, W2, W3, W4 are as follows:

the first cylinder bore W1:
((X1+a1), (Y1+b1));
the second cylinder bore W2:
((X1+105+a2), (Y1+b2));
the third cylinder bore W3:
((X1+210+a3), (Y1+b3)); and
the fourth cylinder bore W4:
((X1+315+a4), (Y1+b4))

wherein a1, a2, a3 and a4 are deviations in the X axis, while b1, b2, b3 and b4 are deviations in the Y axis.

After completion of measurement of the actual positions of the individual cylinder bores of the work block W, the step 18 is followed by its subsequent step 19.

In the step 19: the X table 41 and the Y table 43 are moved to the position ((Xp−a1), (Yp−b1)) so that the deviations a1, b1 of the cylinder bore W1 in its actual position are removed, which enables a center of the first cylinder bore W1 to precisely coincide with a center of the induction heating coil 23. The step 19 is followed by its subsequent step 20.

In the step 20: the drive unit 25 is actuated upon receipt of a pulse signal issued from the control portion 101 of the control means 100. The thus actuated drive unit 25 moves the induction heating coil 23 downward. As a result, the induction heating coil 23 enters the first cylinder bore W1 of the work block W and is positioned therein in a predetermined location. The step 20 is followed by its subsequent step 21.

In the step 21, the induction heating coil 23 is energized to heat the first cylinder bore W1 to a predetermined temperature suitable for starting the quenching of the first cylinder bore W1. When the induction heating coil 23 is de-energized, the first cylinder bore W1 of the work block W is quenched by the cooling liquid in the cooling tank 48 since the first cylinder bore W1 is immersed in the cooling liquid. The step 21 is followed by its subsequent step 22.

In the step 22: the first cylinder bore W1 of the work block W is immersed in the cooling liquid for a predetermined period time, so that the quenching treatment of the first cylinder bore W1 comes to the finish. After completion of this quenching treatment of the first cylinder bore W1, the step 22 is followed by its subsequent step 23.

In the step 23: the drive unit 25 is actuated again upon receipt of a pulse signal issued from the control portion 101 of the control means 100. The thus actuated drive unit 25 pulls up the induction heating coil 23 from the first cylinder bore W1. The step 23 is followed by its subsequent step 24.

In the step 24: as for each of the remaining cylinder bores of the work block W, the same quenching as described above is performed in the same manner. More particularly, after the induction heating coil 23 is pulled out of the first cylinder bore W1, the quenching of the second cylinder bore W2 of the work block W is performed. Namely, the X table 41 and the Y table 43 are moved to the position ((Xp+A−a2), (Yp−b2)) in which the second cylinder bore W2 is quenched. The step 24 is followed by its subsequent step 25.

In the step 25: The X table 41 and the Y table 43 are moved to the position ((Xp+n−1)A−an), (Yp−bn)). The step 25 is followed by its subsequent step 26.

In the step 26: the induction heating coil 23 is inserted into the n'th cylinder bore Wn. The step 26 is followed by its subsequent step 27.

In the step 27: the induction heating coil 23 is energized to heat the inner peripheral surface of the n'th cylinder bore Wn to a predetermined temperature suitable for starting the quenching of the n'th cylinder bore Wn. When the induction heating coil 23 is de-energized, the n'the cylinder bore Wn is quenched by the cooling liquid in the cooling tank 48. The step 27 is followed by its subsequent step 28.

In the step 28: the n'th cylinder bore Wn of the work block W is immersed in the cooling liquid for a predetermined period time, so that the quenching of the n'th cylinder bore Wn comes to the finish. After completion of this quenching of the n'th cylinder bore Wn, the step 28 is followed by its subsequent step 29.

In the step 29: the drive unit 25 is actuated again upon receipt of a pulse signal issued from the control portion 101 of the control means 100. The thus actuated drive unit 25 pulls up the induction heating coil 23 from the n'th cylinder bore Wn. The step 29 is followed by its subsequent step 30.

In the step 30: after completion of such pull-up operation of the induction heating coil 23, the quenching operation of the entire work block W comes to the finish. The step 30 is followed by its subsequent step 31.

In the step 31: the X table 41 and the Y table 43 return to the first position. All the operations described above are automatically performed according to the pulse signals issued from the control portion 101 of the control means 100. After the X table 41 and the Y table 43 reach the first position, the step 31 is followed by its subsequent step 32.

In the step 32: the thus quenched work block W is unloaded from the Y table 43 in the first position, so that the entire precision quenching operation with induction heating comes to the finish.

Incidentally, when the cylinder bores of the work block W are not equally spaced apart from each other and are not parallel to each other, it is necessary to measure individual actual positions ((Xn+an), (Yn+bn)) of the individual cylinder bores Wn and to move the X table 41 and the Y table 43 to individual exact positions ((Xn−an), (Yn−bn)) in which the induction heating coil 23 is energized, which enables the individual cylinder bores Wn to be subjected to the precision quenching operation with induction heating.

In the quenching operation described above for uniformly quenching the inner peripheral surface of the cylinder bore of the work block W, the induction heating coil 23 used therein is generally of a ring type. More particularly, in operation, after each of the cylinder bores of the work block W is moved to the fourth position (shown in FIG. 1) corresponding to the location of the induction heating coil 23 by means of the X table 41 and the Y table 43, the control portion 101 of the control means 100 issues pulse signals to the drive units 25, 26 to actuate them. The thus actuated drive units 25, 26 position the induction heating coil 23 in a predetermined location inside the cylinder bore of the work block W. After that, the induction heating coil 23 is energized according to the pulse signal issued from the control portion 101 of the control means 100, so that the cylinder bore of the work block W is heated to a predetermined temperature suitable for the quenching treatment, and then quenched by the cooling liquid when the heating coil 23 is de-energized.

After completion of the quenching of one of the cylinder bores of the work block W, the drive units 25, 26 are actuated again upon receipt of pulse signals issued from the control portion 101 of the control means 100. The thus actuated drive units 25, 26 pulls up the movable frame 22 so that the induction heating coil 23 is pulled out of the one of the cylinder bores of the work block W. After that, the X table 41 and the Y table 43 are moved to have a subsequent one of the cylinder bores of the work block W reach the fourth position shown in FIG. 1.

Then, the same cycle in operation as that described above is repeated in the same manner, so that the quenching of each of subsequent ones of the cylinder bores of the work block W comes to the finish, whereby the precision quenching operation of the inner surface of the entire work block W comes to the finish.

Further, in the above quenching operation of the inner surface of the work block W, when a mottled pattern of a plurality of rows of quenched layer portions is formed in the inner peripheral surface of each of the cylinder bores of the work block W, the induction heating coil 23 is provided with an inductor 70 in which the annular conductive member 71 as shown in FIG. 8 is provided with a plurality of the concave portions 74 in its inner peripheral surface. The number of these concave portions 74 is "m".

These concave portions 74 lie on the same circumference of the annular conductive member 71, and are spaced apart from each other at equal angular intervals. In this case, in the fourth position shown in FIG. 1, the drive unit 25 is actuated upon receipt of the pulse signal from the control means 100 to move the movable frame 22 downward, so that the induction heating coil 23 is placed inside the cylinder bore of the work block W in a predetermined location corresponding to a first one of the rows of the quenched layer portions of the mottled pattern. After completion of positioning of the induction heating coil 23 inside the cylinder bore, an electric current is applied to terminals 5a, 5b shown in FIG. 8 to energize the induction heating coil 23.

When the inner peripheral surface of the cylinder bore to be quenched reaches a predetermined temperature suitable for the quenching, the induction heating coil 23 is de-energized to permit the inner peripheral surface of such cylinder bore to be quenched by means of the cooling liquid in which the cylinder bore is immersed, so that a first row in the mottled pattern of the quenched layer portions 76a is formed in the inner peripheral surface 76 of the cylinder 75 of the work block W. The total number of the thus formed quenched layer portions 76a, which are arranged in rows in the mottled pattern, is given by an equation:

m×((the number of indexing steps)+1), wherein "m" is the number of the concave portions 74 of the annular conductive member 71.

After completion of the quenching of the first one of the rows of the quenched hardened layer portions 76a in the mottled pattern, the drive unit 25 is actuated again to move down the movable frame 22 by a predetermined distance. This is a first downward step of the induction heating coil 23, in which step the heating coil 23 axially moves downward by the predetermined distance to reach a location corresponding to a second one of the rows of the quenched layer portions 76a in the mottled pattern. In this first downward step of the induction heating coil 23, the drive unit 26 is also actuated to rotatably drive the vertical shaft 24 through a predetermined angle Θm. Under such circumstances, the quenching treatment of the second row is performed, so that each of the quenched layer portions 76a thus formed in the second row angularly deviates in location from a corresponding one of the quenched layer portions 76a of the first row by an angle of Θm.

The above operation is repeated so that a third row, a fourth row, . . . , a k'th row of the quenched layer portions 76a of the mottled pattern are formed in the inner peripheral surface of the cylinder bore of the work block W, as shown in FIG. 3. Namely, each time the quenching is performed, the induction heating coil 23 is axially moved downward by the predetermined distance while rotatably driven through the angle of Θm, so that the entire mottled pattern of the rows of the quenched layer portions 76a is formed in the inner peripheral surface of the cylinder 75 of the work block W, as shown in FIG. 3.

In the quenching operation described above, since the work block W is induction-heated while immersed in the cooling liquid of the cooling tank 48, it is possible to realize a precision quenching of the work block W by simply de-energizing the induction heating coil 23, which improves in hardness the quenched layer portions 76a of the work block W and in efficiency the quenching operation. Further, as described above, it is also possible to further improve the quenching operation by the provision of the cooling means such as the liquid injection nozzle, which injects the cooling liquid into the cylinder bore of the work block W to increase the cooling effect on the quenched layer portions 76a of the work block W.

Further, in the precision quenching apparatus of the present invention, it is also possible to make compensation for variations in position of the induction heating coil 23 by the use of the contact-type electronic probe unit 61 (preferably, TL 35 TYPE produced by Marposs Kabushiki) mounted on the Y table 43 of an X-Y table unit 40 shown in FIG. 1. This X-Y table unit 49 is constructed of: the X table 41; and the Y table 43 slidably mounted on the X table 41.

In order to make such compensation, at first, as shown in FIG. 11, the probe unit 61 has its probe 62 brought into contact with an outer peripheral surface of the head portion 32a of the inner diameter measuring unit 32 to determine the coordinates of an actual position of a center of the inner diameter measuring unit 32. The thus determined coordinates of the actual position of the unit 32 are stored in the memory portion 102 of the control means 100.

Figure 12:
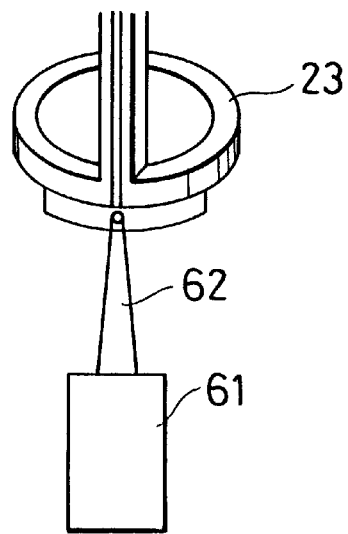
FIG. 12 is a perspective view of the induction heating coil shown in FIG. 1, illustrating the way the induction heating coil has its location measured by the contact-type electronic probe unit of the apparatus of the present invention.

After that, the X-Y table unit 40 is moved to the right as viewed in FIG. 1, so that the probe unit 61 reaches the fourth position, in which: as shown in FIG. 12, the induction heating coil 23 is moved downward to have its lower surface brought into contact with the probe 62 of the probe unit 61 to determine its X and Y coordinates together with its Z coordinate. The thus determined X, Y and Z coordinates of the lower surface of the induction heating coil 23 are stored in the memory portion 102 of the control means 100, and used as initial coordinates of the induction heating unit 23 in order to make compensation for variations in its position during subsequent quenching cycles. In order to realize a precision quenching operation, it is desired to make such compensation since the induction heating coil 23 slightly varies in its working position during a series of the quenching of the cylinder bores of the work block W.

Figure 13:
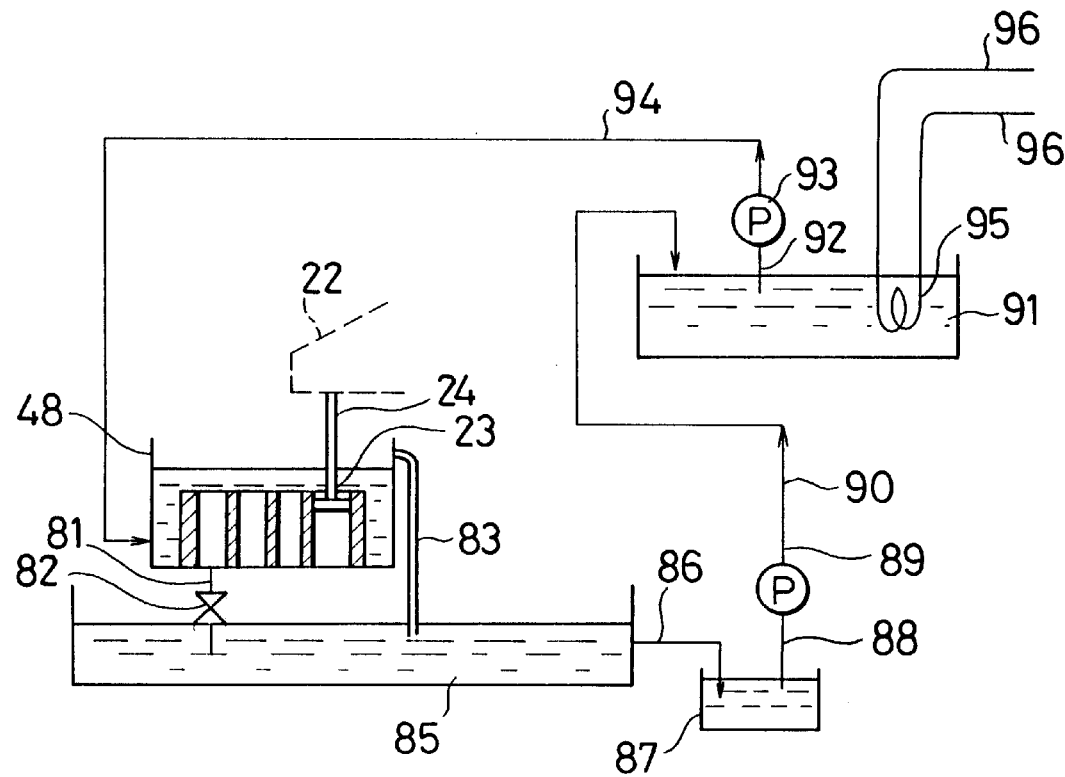
FIG. 13 is a schematic diagram of the cooling system using the cooling liquid in the apparatus of the present invention shown in FIG. 1.
Figure 14:
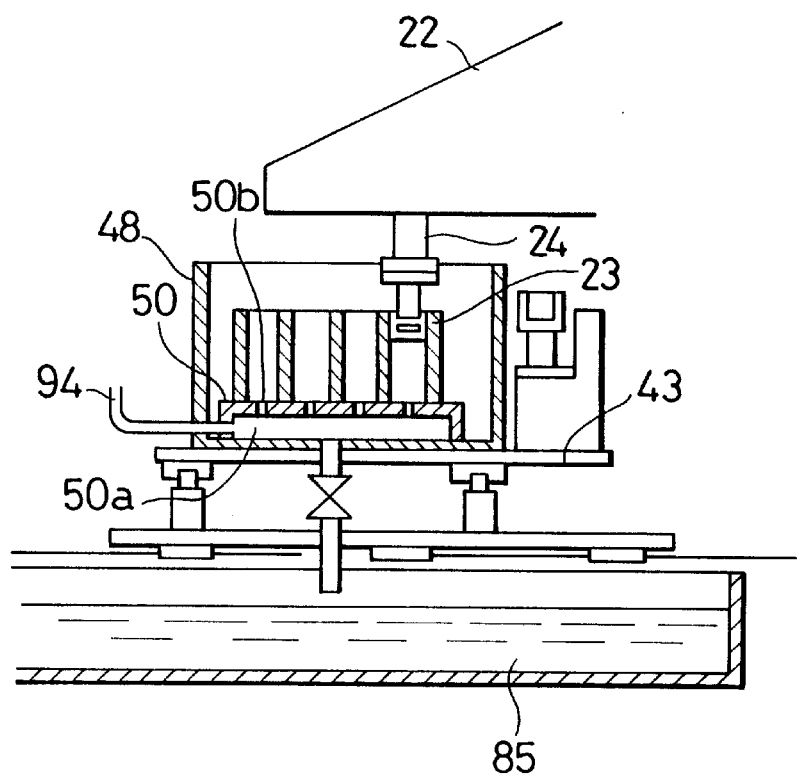
FIG. 14 is a longitudinal sectional view of the cooling liquid tank of the apparatus of the present invention shown in FIG. 1.
Figure 15:
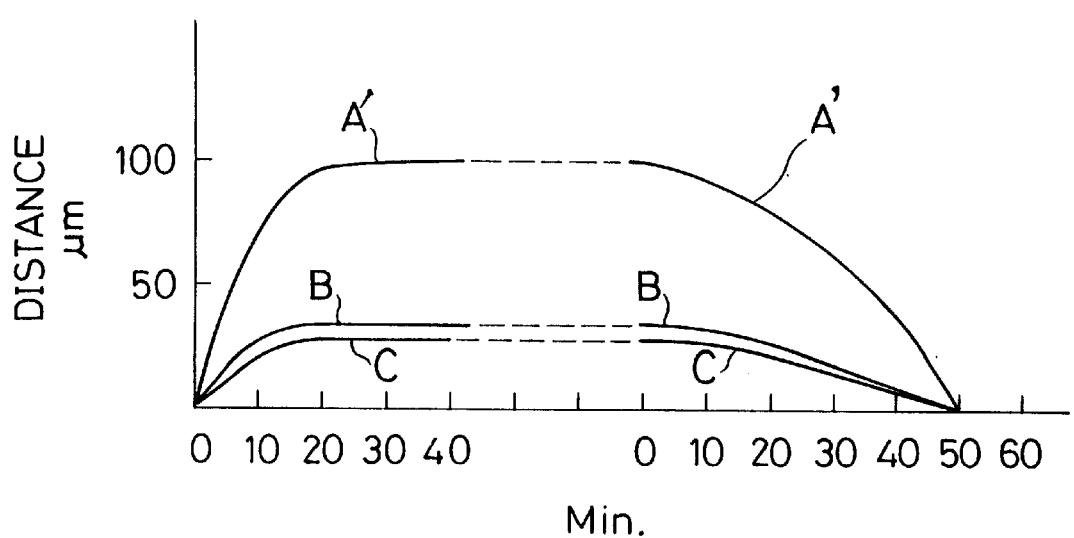
FIG. 15 is a graph illustrating variations in the distance between the induction heating coil and the inner diameter measuring unit of the present invention, as functions of elapsed times.
Figure 16:
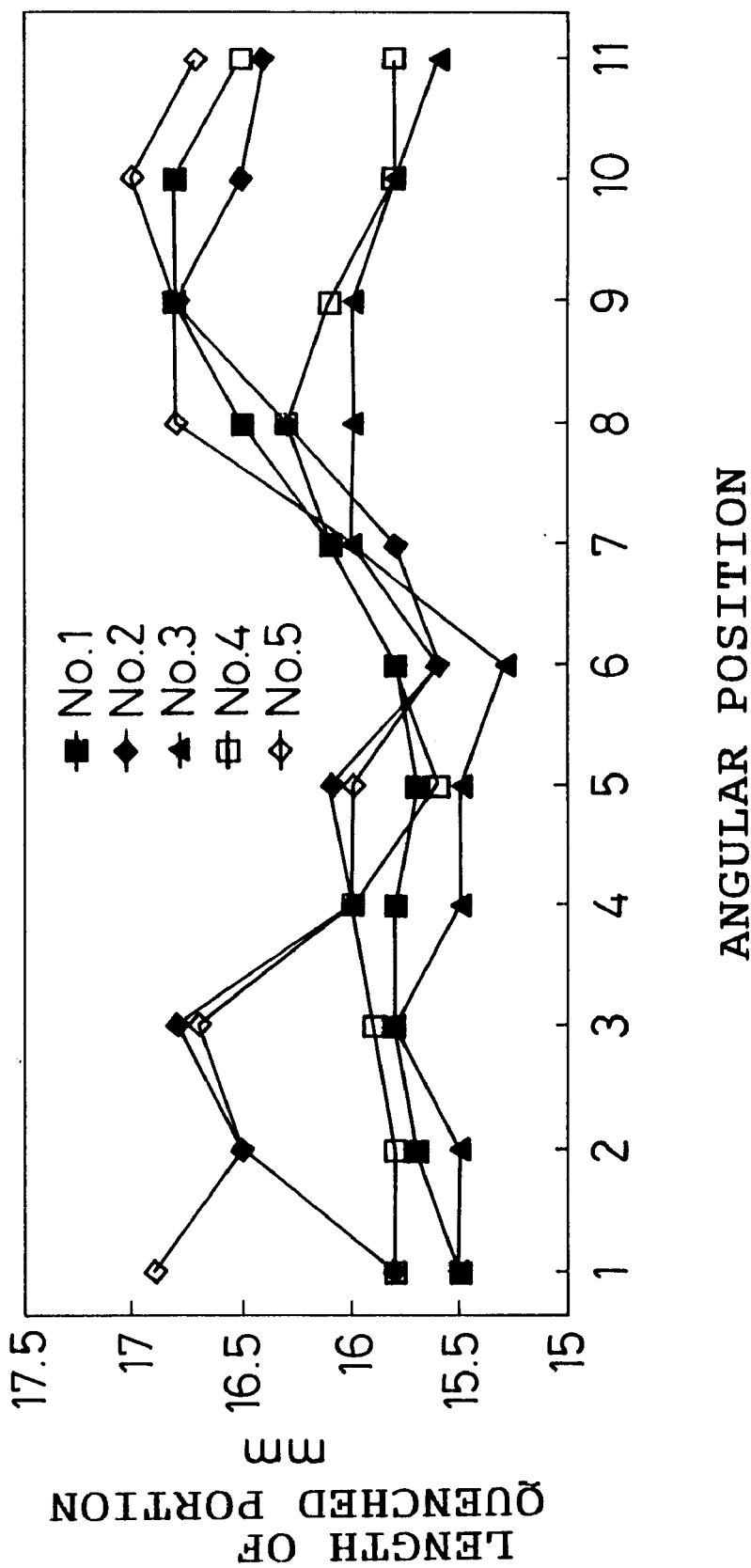
FIG. 16 is a graph illustrating the variations in length of the quenched portions of the cylinder as functions of circumferential positions of the cylinder.

Now, the cooling system of the precision quenching apparatus of the present invention will be described in detail with reference to FIG. 13 which illustrates a schematic diagram of the cooling system, an enlarged view of which is shown in FIG. 14. FIG. 15 is a graph illustrating variations in the distance between the induction heating coil 23 and the position measurement means (i.e., inner diameter measuring unit 32) of the present invention, as functions of elapsed times. FIG. 16 is a graph illustrating variations in length of the quenched portions of the cylinder 75 as functions of circumferential positions of the cylinder 75.

As shown in FIG. 1, in the apparatus of the present invention, the cooling tank 48 is fixedly mounted on the Y table 43, in which tank 48 the work block W is immersed in the cooling liquid. As shown in FIG. 14, the cooling tank 48 is an open-topped vessel assuming a boxy shape. The cooling tank 48 is provided with a hollow portion 50a adjacent to an upper surface of its bottom portion. The hollow portion 50a is provided with a bottom plate 50 on which the work block W to be quenched is fixedly mounted. In the cooling system shown in FIG. 14, the cooling liquid is supplied from a pipe 94 into the hollow portion 50a.

The bottom plate 50 of the hollow portion 50a is provided with a plurality of liquid injection nozzles 50b the number of which is the same as that of the cylinders of the work block W. In the bottom plate 50, each of the injection nozzles 50b is formed in a position corresponding to a center of each of the cylinder bores of the work block W mounted on the bottom plate 50. Consequently, the cooling liquid received in the hollow portion 50a is injected into each of the cylinder bores of the work block W and supplied to the cooling tank 48 therethrough.

As shown in FIG. 13, an overflow pipe 83 is provided in a side wall portion of the cooling tank 48 to release an excessive amount of the cooling liquid from the tank 48, which makes it possible to keep constant the level of the cooling liquid in the tank 48. As is clear from FIG. 13, at least one drain pipe 81, which is provided with a valve 82, is provided in the bottom portion of the cooling tank 48 to form a cooling liquid exchanging means for exchanging the used cooling liquid for a new one.

More particularly, the exchanging operation of the cooling liquid is performed as follows: when the quenching treatment of the work block W or of its cylinder bore comes to the finish, the valve 82 is opened to promptly discharge the used cooling liquid from the cooling tank 48 in order to promptly exchange the used or heated cooling liquid with a new one which is uniform in temperature. Due to such exchanging of the cooling liquid, it is possible to perform the quenching in stable conditions, which makes the quenched portion uniform in hardness, and also makes it possible to promptly exchange the thus quenched cylinder or work block W for a new one.

As shown in FIG. 1, housed in the interior of the base frame 11 is a cooling liquid reservoir 85 assuming an elongated open-topped boxy shape, which is thermally isolated from the base frame 11. In other words, there is substantially no fear that variation in temperature of the cooling liquid affects the base frame 11 in temperature.

Since the reservoir 85 is opened in its top, it is possible for the reservoir 85 to receive the cooling liquid discharged from both the drain pipe 81 and the overflow pipe 83 (shown in FIG. 13) even when the cooling tank 48 travels in the X and the direction Y together with the X-Y table 40. In the cooling system shown in FIG. 13, the cooling liquid discharged into the reservoir 85 is supplied to a liquid receiving tank 87 through a pipe 86. The cooling liquid thus received in the tank 87 is then supplied to a liquid source tank 91 through a pipe 88, pump 89 and a pipe 90. This source tank 91 is disposed outside the base frame 11, and provided with a pipe 96 through which a cooling water is supplied to a heat exchanger 95.

The heat exchanger 95 cools the cooling requid in the source tank 91 to keep the liquid at the room temperature. In this case, industrial water having room temperatures may be used as the cooling water. Consequently, in the cooling system shown in FIG. 13, the heat exchanger 95 can be used without any refrigerating means. This is advantageous from an economical point of view. The cooling liquid kept at the room temperature in the source tank 91 is then supplied to the cooling tank 48 through a pipe 92, pump 93 and a pipe 94, and injected into the cooling tank 48 through the injection nozzles 50b and the cylinder bore of the work block W.

In the quenching operation, the work block W, which is immersed in the cooling liquid in the cooling tank 48, is induction-heated by means of the induction heating coil 23 when the coil 23 is energized. After completion of heating, the induction heating coil 23 is de-energized to permit the work block W to be immediately quenched by means of the cooling liquid in the tank 48.

As described above, when the distance between the inner diameter measuring unit 32 and the induction heating coil 23 does not vary, it is possible to perform the quenching operation on the basis of a series of simply measured values which are determined by means of the inner diameter measuring unit 32 (i.e., position measuring means) and simply calculated by means of the control means 100. However, in actual quenching operation, at the beginning of the operation, the temperature of the quenching apparatus of the present invention is still low, and gradually becomes higher as the operation is proceeding, which causes the above-mentioned distance to vary due to thermal expansion of the base frame 11.

Consequently, when the quenching operation is conducted on the basis of such simply measured and the simply calculated values described above, the induction heating coil 23 deviates in center from the cylinder bore of the work block W, and, therefore fails to properly heat the inner peripheral surface of the cylinder bore, which impairs the quenched portions of the cylinder bore in quality. The distance between the inner diameter measuring unit 32 and the induction heating coil 23 varies even when the quenching operation is not conducted, since the base frame 11 thermally expands due to heat generated in motors used in the apparatus.

Shown in FIG. 15 is an example of a graph, which shows variations in the distance between the induction heating coil 23 and the position measurement means (i.e., inner diameter measuring unit 32), as functions of elapsed times. In the left half of the graph shown in FIG. 15, a curve B shows how the distance varies in a condition in which: the room temperature is 22 degrees centigrade; and, the apparatus of the present invention is ready for quenching operation.

As is clear from the curve B, when the preparation stage for the quenching operation are pushed forward, the base frame 11 gradually increases in temperature, which causes the distance to gradually increase. In the left half of the graph shown in FIG. 15, when the elapse time reaches 10 minutes in X axis, the distance increases by approximately 30 $\mu$m. This increased value of approximately 30 $\mu$m is kept during the remaining period of the preparation stage. On the other hand, when the quenching operation comes to the finish, the temperature of the apparatus gradually decreases at lower rate than that of its increasing temperature.

Consequently, as shown in the right half of the graph of FIG. 15, it takes approximately 50 minutes for the distance to return to its initial value measured before the quenching operation starts. In the quenching operation, a deviation up to approximately 30 μm of the center of the induction heating coil 23 from the center of the cylinder bore of the work block W is allowable. Consequently, as is clear from the graph of FIG. 15, it is possible for the apparatus of the present invention to realize a precision quenching operation.

The curve B shown in FIG. 15 is obtained in the preparation stage of the quenching operation without circulating the cooling liquid.

A curve A' shown in the left half of the graph of FIG. 15 shows how the distance between the inner diameter measuring unit 32 and the induction heating coil 23 varies in a condition in which the cooling liquid is kept at a temperature of 32 degrees centigrade (normally, between 30 to 40 degrees centigrade as described above) by circulating the cooling liquid through the cooling tank 48. As is clear from the left half of the curve A', when the elapse time reaches 20 minutes in X axis of the graph shown in FIG. 15, the distance increases by approximately 100 μm. This increased value of approximately 100 μm is kept during the remaining period of the preparation stage. As a result, it is found that: when the cooling liquid used is kept at a temperature of from 30 to 40 degrees centigrade, it is not possible to keep the clearance between the induction heating coil 23 and the cylinder bore of the work block W within an allowable range of 1.25 mm plus or minus 0.15 mm when the above-mentioned measured value obtained at the room temperature and stored in the control means 100 are simply used in the quenching operation for positioning the cylinder bore of the work block W relative to the induction heating coil 23.

Then, the cooling liquid is kept at a temperature of 22 degrees centigrade which is equal to the room temperature, and repeatedly discharged into and out of the cooling tank 48 so that a curve C is obtained, as shown in FIG. 15. As is clear from the left half of the curve C, the distance between the inner diameter measuring unit 32 and the induction heating coil 23 varies in the substantially same manner as that of the curve B, but in lower level than the curve B. Consequently, in the curve C, when the elapse time reaches 15 minutes, the distance reaches its maximum level. This is due to the effects of the cooling liquid kept at the room temperature, which keeps the operating temperature of the apparatus low as shown in the curve C lower in level than the curve B.

On the other hand, the right half of the graph in FIG. 15 shows how the distance varies after completion of the quenching operation. As is clear from the right halves of the curves A', B and C, there is substantially no difference therebetween in elapse time required to have the distance return to its initial value.

In the graph shown in FIG. 15, these curves A', B and C are obtained in a condition in which the reservoir 85 (shown in FIG. 1) incorporated in the base frame 11 of the apparatus is not thermally isolated from the base frame 11. Consequently, it is possible to further suppress the distance' variations by thermally isolating the reservoir 85 from the base frame 11.

EXAMPLE

As is clear from the above results, it is found that: when the quenching operation is performed using the cooling liquid kept at the room temperature, it is possible to keep the clearance between the induction heating coil 23 and the cylinder bore of the work block W within the allowable range described above, without making any compensation of the calculated values stored in the control means 100.

Consequently, when the room temperature was 22 degrees centigrade, the cooling liquid was kept at this room temperature of 22 degrees centigrade. Under such circumstances, a mottled pattern of six rows of quenched layer portions 76a was formed in an inner peripheral surface of each of in-line cylinders of the work block W, wherein the number of the in-line cylinders was six; these cylinders were spaced apart from each other at intervals of 105 mm; and, an inner diameter of each of the cylinders was 80 mm.

In order to set the clearance between the induction heating coil 23 and the inner peripheral surface of each of the cylinders of the work block W at 1.25 mm, the induction heating coil 23 was provided with the annular conductive member 71 (shown in FIG. 8), formed in an inner peripheral surface of which member 71 were a plurality of the equally-spaced concave portions 74 the number of which was 12, wherein an outer diameter of the annular conductive member 71 was 77.5 mm. The annular conductive member 71 was formed into the inductor 70. In the quenching operation for producing the mottled pattern of rows of quenched portions 76a: the induction heating coil 23 was used; the drive unit 25 was actuated upon receipt of a pulse signal issued from the control means 100, so that the induction heating coil 23 was positioned in its lowest location corresponding to a first one of the rows in the mottled pattern; and, then, the induction heating coil 23 was energized so that the first one of the rows in the mottled pattern was formed in the inner peripheral surface of the cylinder of the work block W.

After completion of quenching operation of the first one of the rows in the mottled pattern, the induction heating coil 23 was positioned in a second location which was one level higher than its lowest location and corresponded to a second one of the rows in the mottled pattern. At the same time, the induction heating coil 23 was rotated by ¹/₂₄ turn. After that, the induction heating coil 23 was energized and de-energized so that the second one of the rows of quenched layer portions 76a in the mottled pattern was produced. Each of the remaining rows of quenched layer portions 76a in the mottled pattern was produced in the same manner as that described above, so that six rows of quenched layer portions 76a of the mottled pattern were formed in the inner peripheral surface of the cylinder of the work block W.

Variations in profile (i.e., longitudinal length) of each individual quenched layer portion 76a of the inner surface of the fourth cylinder of each of five work blocks W are shown in the graph of FIG. 16, in which each of Nos. 1 to 5 is an order number of each of a plurality of the work blocks W. The graph of FIG. 16 was obtained from an uppermost one of the rows of the quenched layer portions 76a of the inner peripheral surface of the fourth cylinder of each of the work blocks W. As is clear from FIG. 16, a difference in longitudinal length (i.e., in circumferential length) between any ones of the quenched layer portions 76a in any of the work blocks W was up to 1.5 mm. Since a difference in width (i.e., in axial length) between any ones of the quenched layer portions 76a in any of the work blocks W was negligible, such difference in width was neglected in the graph of FIG. 16.

Further, it was found, on a so-called fluorescent penetrant inspection, that there was no quenching crack in any of the quenched layer portions 76a. In other words, in the quenching method of the present invention, even when the cooling liquid having a temperature of less than or equal to 30 degrees centigrade is used to perform the quenching operation, it is possible to obtain sound quenched layer portions 76a free from any quenching crack.

Further, when the induction heating coil 23 was intermittently moved upward step by step from a location corresponding to the lowermost one of the rows of the mottled pattern of the quenched layer portions 76a in the cylinder bore of the work block W to perform the quenching operation of the cylinder bore (hereinafter referred to as the first case), the thus obtained quenched layer portion 76a in the uppermost row of the mottled pattern was larger in depth of hardened area than that in the lowermost row of the same mottled pattern by approximately 0.2 mm in average.

In contrast with this, when the induction heating coil 23 was intermittently moved downward step by step from a location corresponding to the uppermost one of the rows of the mottled pattern of the quenched layer portions 76a in the cylinder bore of the work block W to perform the quenching operation of the cylinder bore (hereinafter referred to as the first case), there was substantially no difference in depth of hardened area between the thus obtained quenched layer portion 76a in the uppermost row of the mottled pattern and that in the lowermost row of the same mottled pattern. This is because: in the first case, the cooling liquid heated during the quenching operation of the lowermost row of the mottled pattern is always moved upward by convection to increase in temperature the remaining upper portions of the cylinder of the work block W, which facilitates heating of the remaining upper portions to a predetermined quench-starting temperature in their quenching; and, in the second case, it is possible to keep the temperature of the cooling liquid substantially constant during the entire quenching of the rows of the mottled pattern.

As described above, in the precision quenching apparatus with induction heating of the present invention having the above construction, since the above quenching stage of operation is automatically performed on the basis of the pulse signals issued from the control portion 101 of the control means 100 provided with the memory portion 102, it is possible to precisely align a center of the induction heating coil 23 with that of each of the cylinder bores of the work block W, which makes it possible: to keep substantially constant the clearance between the outer peripheral surface of the induction heating coil 23 and the inner peripheral surface of the cylinder bore; to prevent the quenched layer portions 76a of the mottled pattern from varying in quality; and, to quench-harden the work blocks W on a large-scale basis.

In the present invention, by using the induction heating coil 23 forming the inductor 70 constructed of the annular conductive member 71 having the concave portions 74 equally and circumferentially spaced apart from each other, it is possible to precisely form the mottled pattern of a plurality of rows of the quenched layer portions 76a in high quality in the inner peripheral surface of the cylinder of the work block W. Further, since the induction heating coil 23 is intermittently moved vertically step by step while rotated through a predetermined angle in each individual step, such mottled pattern of the plurality of rows of the quenched layer portions 76a is easily formed in the inner peripheral surface of the cylinder of the work block W.

As described above, in the precision quenching method with induction heating of the present invention, since the quenching operation is performed using the cooling liquid kept at the room temperature, variations in temperature of the quenching apparatus of the present invention are minimized during the entire quenching operation, which minimizes variations in the distance between the induction heating coil 23 and the position measuring means (i.e., inner diameter measuring unit) 32.

Consequently, it is possible for the method of the present invention to perform a precision quenching operation of the work block W without making any compensation of the values having been set in the control means 100, on the basis of the measured values obtained at the beginning of the quenching operation.

Further, in the present invention, it has been also confirmed that no quenching crack occurs in the work block W even when the cooling liquid having the room temperature is used in the quenching operation of the work block W, provided that the room temperature is larger than or equal to 20 degrees centigrade. Consequently, it is possible for the apparatus of the present invention to eliminate a conventional chilling machine and like chillers using a special cooling liquid, which enables the apparatus of the present invention to realize a considerable cost reduction. Further, in the present invention, it is possible to perform a precision quenching operation with induction heating without forcing workers to do any warm-up job of the quenching apparatus in the early morning, and without making any cumbersome compensation of the control means 100. Further, in the present invention, since the mottled pattern of rows of the quenched layer portions 76a is gradually formed step by step from its lowest row in the mottled pattern toward the uppermost row of the same mottled pattern, it is possible to minimize variations in temperature of the cooling liquid heated in each individual quenching operation.

As described above, in the precision quenching apparatus with induction heating of the present invention, when a mottled pattern of a plurality of rows of the quenched layer portions 76a is formed in an inner peripheral surface of each of the in-line cylinders of the work block W, since a center of the induction heating coil 23 is automatically aligned with a center of each individual cylinder of the work block W, it is possible to form the mottled pattern in high quality in the inner peripheral surface of the cylinder of the work block W, wherein the quenched layer portions 76a are uniform in depth. Such automatic alignment operation in center described above makes it possible to quench-harden the work blocks W on a large-scale basis.

What is claimed is:

1. A precision quenching apparatus with induction heating, for quenching a plurality of rows of portions of a work block, said apparatus comprising:

a Y table for carrying said work block thereon, said Y table being capable of traveling in direction Y in a reciprocating manner;

an X table for causing said work block mounted on said Y table to move back and forth in a reciprocating manner in direction X between a first position, in which said work block is loaded onto and unloaded from said Y table, and a fourth position, in which said induction heating coil is disposed;

a base frame on which said X table is mounted;

a first reference member mounted on said Y table, said first reference member positioning said plurality of rows of said portions of said work block in desired locations when said work block is loaded onto said Y table;

a second reference member mounted on said Y table, said second reference member serving as a reference point for determining coordinates of said X and said Y table;

a position measuring device for measuring coordinates of both a position of said second reference member and positions of said portions of said work block to issue measured coordinate values, said position measuring device being fixedly mounted on said base frame in a second position intermediate between said first and said fourth position;

an induction heating coil disposed in said fourth position on said base frame;

a control means for controlling in operation said X and said Y tables together with said induction heating coil on the basis of said measured coordinate values issued from said position measuring device; and a quenching apparatus to quench said portions of said work block which has been heated in said portions thereof.

2. The precision quenching apparatus with induction heating, as set forth in claim 1, wherein:

said work block to be quenched is a cylinder block provided with a plurality of cylinders which are arranged in line and spaced apart from each other at intervals of "A"; and said control means carries out a precision quenching method with induction heating, said method comprising the steps of:

(1) mounting a master block on said Y table in a manner such that said master block has a row of its in-line cylinders aligned with an X axis with reference to said first reference member mounted on said Y table, said master block having the same dimensions as those of said work block;

(2) moving both said X and said Y tables to a position (Xo, Yo), in which said position measuring device coincides in center with said second reference member, to measure the coordinates of said position (Xo, Yo);

(3) further moving both said X and said Y tables to a position (X1, Y1), in which said position measuring device coincides in center with a first cylinder bore of said master block, to measure the coordinates of said position (X1, Y1);

(4) calculate a position ((X1+(n−1)xA), Y1), to which both said X and said Y tables are moved and in which said position measuring device coincides in center with the n'th cylinder bore of said master block, on the basis of the coordinates of said position (X1, Y1);

(5) moving both said X and said Y tables to a position (Xp, Yp), in which said first cylinder bore coincides in center with said induction heating coil, to measure the coordinates of said position (Xp, Yp);

(6) storing all the coordinates of said positions (Xo, Yo), (X1, Y1), ((X1+(n−1)xA), Y1), (Xp, Yp) in said control means;

(7) replacing said master block with said work block;

(8) moving both said X and said Y tables to a position ((X1+(n−1)xA+an), (Y1+bn)), in which said position measuring device coincides in center with the n'th cylinder bore of said work block, to measure the coordinates of said position ((X1+(n−1)xA+an), (Y1+bn)), wherein each of "an" and "bn" are deviations from preset values; and (9) further moving both said X and said Y tables to a position ((Xp+(n−1)xA−an), (Yp−bn)), in which the n'th cylinder bore of said work block has its inner peripheral surface induction-heated and quenched, wherein each of "an" and "bn" are deviations from preset values.

3. The precision quenching apparatus with induction heating, as set forth in claim 2, wherein:

said induction heating coil is mounted on a first vertical shaft in a manner such that said coil is axially moved up and down in direction Z and circumferentially rotatable in direction Θ to enter and exit any one of said cylinder bores of said work block, said first vertical shaft being disposed over said base frame in said fourth position; and said control means is provided with a control portion for controlling in stroke and rotation said induction heating coil.

4. The precision quenching apparatus with induction heating, as set forth in claim 2 or 3, wherein:

said work block has its cylinder bore quenched in a manner such that a mottled pattern of hardened layer portions is formed in an inner peripheral surface of said cylinder bore, wherein said induction heating coil has an outer diameter smaller than an inner diameter of said cylinder bore by a clearance;

said induction heating coil is provided with an annular conductive member; and said annular conductive member is provided with a plurality of concave portions which correspond in position to said mottled pattern of said inner peripheral surface of said cylinder bore.

5. The precision quenching apparatus with induction heating, as set forth in claim 2 or 3, wherein:

said second reference member is constructed of a gauge ring which has the substantially same inner diameter as that of said cylinder bore of said work block, said gauge ring having its axis be perpendicular to said X and said Y tables;

said position measuring device is constructed of an inner diameter measuring unit provided with a measuring head portion on which at least three extensible and retractable probes are radially arranged, said probes being brought into contact with an inner peripheral surface of said cylinder bore of said work block to measure a deviation of a center of said inner peripheral surface; and said measuring head portion of said inner diameter measuring unit is mounted on a second vertical shaft in said second position of said base frame in a manner such that said measuring head portion is movable up and down in said direction Z to enter and exit any one of said gauge ring and said cylinder bores of said work block.

6. The precision quenching apparatus with induction heating, as set forth in claim 2 or 3, wherein:

the apparatus further comprises a probe measuring unit fixedly mounted on said Y table; and said probe measuring unit has its probe brought into contact with an outer peripheral surface or a bottom surface of any one of said inner diameter measuring unit and said induction heating coil to measure them in position and store the coordinates of the positions of said inner diameter measuring unit and of said induction heating coil, so that both said inner diameter measuring unit and of said induction heating coil are corrected in coordinates of their mounting position.

7. The precision quenching apparatus with induction heating, as set forth in claim 2 or 3, wherein:

the apparatus further comprises a cooling system for injecting a cooling liquid into said cylinder bore of said work block during quenching operation.

8. The precision quenching apparatus with induction heating, as set forth in claim 2 or 3, wherein:

the apparatus further comprises a cooling tank in which said cylinder bore of said work block is immersed in a cooling liquid during quenching operation; and said cooling tank is provided with: a level controlling unit for keeping constant the level of said cooling liquid received in said cooling tank; and, a liquid exchanging unit for exchanging said cooling liquid for a new one each time the quenching operation of said work block or of a part of said work block is performed.

9. The precision quenching apparatus with induction heating, as set forth in claim 7, wherein:

the apparatus further comprises a supply tank for supplying and recirculating said cooling liquid, said supply tank being incorporated in a base frame while thermally isolated therefrom.

10. The precision quenching apparatus with induction heating, as set forth in claim 7, wherein:

the apparatus further comprises a liquid temperature control unit for controlling in temperature said cooling liquid so as to keep it at substantially room temperature.

11. The precision quenching apparatus with induction heating, as set forth in claim 8, wherein:

the apparatus further comprises a supply tank for supplying and recirculating said cooling liquid, said supply tank being incorporated in a base frame while thermally isolated therefrom.

12. The precision quenching apparatus with induction heating, as set forth in claim 8 wherein:

the apparatus further comprises a liquid temperature control means for controlling in temperature said cooling liquid so as to keep it at substantially room temperature.

* * * * *